United States Patent
Chen et al.

(10) Patent No.: US 10,028,352 B2
(45) Date of Patent: *Jul. 17, 2018

(54) TECHNIQUES FOR GESTURE-BASED CONTROL OF COLOR-TUNABLE LIGHTING

(71) Applicant: Osram Sylvania Inc., Wilmington, MA (US)

(72) Inventors: Nancy Chen, North Andover, MA (US); John Selverian, North Reading, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,246

(22) Filed: Apr. 26, 2017

(65) Prior Publication Data
US 2017/0245340 A1  Aug. 24, 2017

Related U.S. Application Data

(63) Continuation of application No. 14/991,461, filed on Jan. 8, 2016, now Pat. No. 9,674,931.

(51) Int. Cl.
*H05B 37/02* (2006.01)
*H05B 33/08* (2006.01)

(52) U.S. Cl.
CPC ..... *H05B 33/0863* (2013.01); *H05B 37/0272* (2013.01)

(58) Field of Classification Search
CPC ................................................ H05B 37/0272
USPC .................................. 315/292, 293; 345/173
See application file for complete search history.

(56) References Cited

U.S. PATENT DOCUMENTS

| 9,445,480 B2 * | 9/2016 | Min | H05B 33/0842 |
| 2013/0141009 A1 * | 6/2013 | Jin | H05B 33/0863 315/292 |
| 2015/0061539 A1 * | 3/2015 | Hirayama | H05B 37/0272 315/292 |
| 2016/0037611 A1 * | 2/2016 | Min | H05B 33/0842 315/152 |

\* cited by examiner

*Primary Examiner* — Thuy Vinh Tran
(74) *Attorney, Agent, or Firm* — Yutian Ling

(57) ABSTRACT

Techniques are disclosed herein for a lighting interface system configured to adjust tunable lighting characteristics output by one or more lighting devices based on a plurality of simple, intuitive touch-gestures without necessarily providing visual indicators via a display screen or other feedback elements. The lighting interface system is implemented as a relatively simple touchpad device that is wall-mounted or portable depending on a desired configuration. The lighting interface system is configured to capture user-gestures via the touchpad device and translate the same into target lighting characteristics and an adjustment value to adjust each of the target lighting characteristics thereby. User gestures are adjustably mapped to lighting characteristics including, for example, intensity, color temperature, hue and color saturation. The lighting interface system is also configured to recognize navigation gestures, which allow a user to target one or more specific lighting devices to make adjustments thereto.

18 Claims, 12 Drawing Sheets

TECHNIQUES FOR GESTURE-BASED CONTROL OF COLOR-TUNABLE LIGHTING

CROSS-REFERENCE TO RELATED APPLICATIONS

This patent application is a continuation of U.S. patent application Ser. No. 14/991,461, titled "Techniques for Gesture-Based Control of Color-Tunable Lighting," filed on Jan. 8, 2016, which is now U.S. Pat. No. 9,674,931 B1, which is herein incorporated by reference in its entirety.

FIELD

The present disclosure is generally directed to lighting controllers, and more particularly, to techniques for gesture-based control of tunable lighting devices using a touchpad device.

BACKGROUND

The power of artificial light to transform human perception is a powerful tool that is often exploited to maximize dramatic effect, draw contrast, and to generally affect a viewer's perception of a given room or location. Continued advancement in lighting technology has enabled a high-degree of user control and flexibility to achieve a desired lighting effect by providing control of various individual lighting characteristics. For example, solid-state lighting (SSL) devices can offer tunable output with independent control over a number of various lighting characteristics including intensity, color temperature, hue, saturation, and spatial distribution, just to name a few. However, providing users with a simple and intuitive mechanism to adjust a number of lighting characteristics to achieve a particular desired lighting effect, or scene, continues to raise numerous non-trivial challenges.

BRIEF DESCRIPTION OF THE DRAWINGS

FIGS. 7E-7H illustrate various multi-touch gestures that may be recognized by the lighting interface system of FIG. 1 and used to adjust lighting characteristics output by one or more lighting devices, in accordance with various embodiments of the present disclosure.

Figure 1:
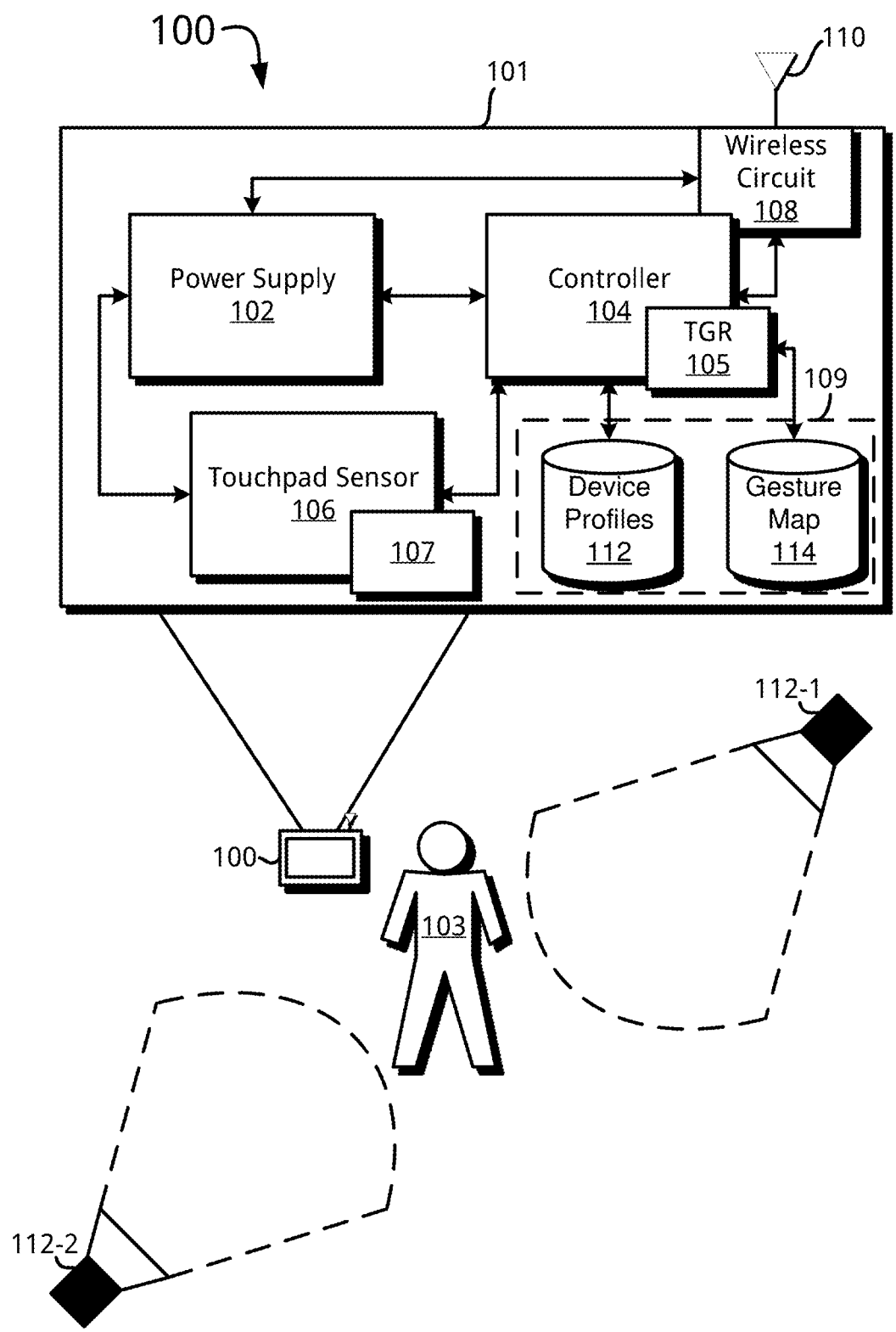
FIG. 1 is a block diagram of an example lighting interface system, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Lighting devices such as SSL devices continue to increase in sophistication and capability, and now offer a wide-range of user-tunable light output characteristics including, for example, intensity, color temperature, hue, saturation, and spatial distribution, just to name a few. Some approaches to providing a user interface capable of fine-tune adjustments to these modern lighting devices includes the use of a so-called "app" which is executed on a smart phone or other computing device. These app-based approaches may present a graphical user interface (GUI) with dials, switches, color-pallets and other controls to translate user-input into adjustments to lighting characteristics. However, this approach requires that a smart device or other such computing device be present and available to make desired adjustments. Moreover, such general-purpose computing devices may not be particularly well suited for lighting adjustments. For example, multiple users may seek to perform lighting adjustments for a given room or location. Thus a password or pin-protected mobile computing device may make such communal-control difficult, and moreover, sharing of a password or pin may circumvent best or otherwise advisable security practices. In addition, and even for the most-common of lighting adjustment functions, a user may be required perform a number of gestures and selections, with the gestures being performed on any number of application windows (e.g., different application pages), and via any number of controls. Thus a user may have to invest time and energy into training and tutorials to exploit the full-extent of the lighting control features offered by a given app. Even when a user has experience and skills to utilize such apps, they may still prefer having a dedicated controller, such as a wall-mounted device, that provides convenient access to basic lighting control such as, for instance, on/off and dimming capabilities.

Thus, in accordance with an embodiment, techniques are disclosed herein for a lighting interface system configured to adjust a wide-range of tunable lighting characteristics based on a plurality of predefined touch-based gestures without necessarily providing visual indicators via a display screen or other feedback elements. In an embodiment, the lighting interface system may be implemented as a relatively simple touchpad device which may be wall-mounted or portable, or both, depending on a desired configuration. The lighting interface system may be configured to capture user-input via a touchpad sensor and translate the same into one or more target lighting characteristics and an adjustment value to adjust each of the one or more target lighting characteristics thereby. The lighting interface system may also be configured to recognize navigation gestures, which may allow a user to select/target one or more specific lighting devices to make adjustments to.

In more detail, the example lighting interface system disclosed herein includes a touchpad device or sensor configured to receive touch-based input from a user. The touchpad sensor may comprise a capacitive or resistive-type touchpad, and may be configured to receive and identify both single-finger and multi-touch gestures. The lighting interface system may include a plurality of predefined gestures and may use the same to detect patterns within one or more touchpoints received via the touchpad sensor. The lighting interface system may store the plurality of predefined gestures in a gesture map that correlates each gesture with one or more lighting characteristics. Thus the lighting interface system may identify a particular lighting characteristic to adjust based on identifying an associated gesture and performing a lookup via the gesture map. The lighting interface system may determine the extent of the adjustment to derive an adjustment value based on the relative motion of the gesture. For instance, a one-finger swipe with a starting touchpoint at a far-left side of the touchpad and ending at a far-right side of the touchpad may cause an adjustment of 100% to an associated lighting characteristic. Conversely, a one-finger swipe starting at a far-left (or far-right) side ending at a midpoint of the touchpad may cause an adjustment of 50%. Thus lighting interface system 100 may prevent "jumping" or otherwise inadvertent adjustments to lighting characteristics that may otherwise be caused by a user's initial touch contact. It should be appreciated that adjustment values determined by the lighting interface system may not necessarily be linear and may be calculated based on non-linear functions such as logarithmic functions. In addition, adjustment values may correspond to a fixed setting or level for a target lighting characteristics, such as a specific identifier of a hue or brightness level (e.g., 0%, 10%, 100%, and so on), for example. Alternatively, or in addition to fixed settings or levels, the adjustment values may correspond to a relative change such as a 5% or a −5% change from a current level, for example.

In any event, and in response to identifying one or more target lighting characteristics and an adjustment value for each of the target lighting characteristics, the lighting interface system may transmit lighting commands to lighting devices to apply adjustments to output light characteristics. The lighting characteristics may include, for example, intensity, color temperature, hue, saturation and spatial distribution. In an embodiment, simple one-finger gestures may be advantageously mapped to common lighting adjustments such as intensity and color temperature. On the other hand, and in accordance with an embodiment, relatively advanced adjustments such as those directed to hue and color saturation may each be mapped to multi-touch gestures.

In another embodiment, the lighting interface system may support navigation gestures that allow a user to select/target one or more lighting devices of a plurality of lighting devices to adjust. In particular, the lighting interface system may support a plurality of lighting selection modes including single-target, group-target and multi-target modes. For example, a room or other location may feature a plurality of lighting devices. Thus the lighting interface system may maintain a list or database of lighting devices in a memory. The list of lighting devices may be user-programmable or otherwise "learned" by a discovery routine executed by the lighting interface system. Each entry in the list of lighting devices may include a number of parameters corresponding to current output light characteristics. To adjust a single lighting device within the list, the lighting interface system may allow a user to enter the single-target mode by performing a navigation gesture. The navigation gesture may include, for example, a three-finger horizontal swipe to the left or right. Thus a navigation gesture swiped to the left may cause the lighting interface system to iterate through the list of lighting devices in a forward direction. On the other hand, each navigation gesture swiped to the right may cause the lighting interface system to iterate through the list in a backward direction. Also note that in some cases lighting devices may be associated with one or more groups of lighting devices. Thus navigation gestures may iterate through lighting device groups in a similar fashion, whereby selection of a given lighting device group causes the lighting interface system to select/target each lighting device associated with the given lighting device group. Thus selection of a lighting device group by the lighting interface system may be understood as the group-target mode. As should be appreciated, navigation gestures are not necessarily limited to horizontal swipe gestures and may comprise vertical swipe gestures and/or gestures with varying numbers of fingers.

In an embodiment, the lighting interface system may enter a multi-target mode when the navigation gestures exceed the present number of lighting devices/lighting device groups represented within the list. For example, if the number of forward navigation gestures performed advances the selected/target lighting device to the last lighting device within the list, then a subsequent forward navigation gesture may cause the lighting interface system to enter a multi-target mode, which may then select/target all lighting devices represented within the list of lighting devices. In any event, the lighting interface system may transmit a lighting command via wireless communication to the one or more targeted lighting devices in response to navigation gestures in order to cause selected lighting devices to "blink" or otherwise indicate selection to a user.

In one specific example embodiment, the lighting interface system is implemented within a portable touchpad device, with the touchpad device having one or more batteries, a controller, a memory, a touchpad sensor, and a wireless transceiver circuit. The touchpad device may not necessarily feature hardware buttons or visual elements such as a display screen. The touchpad may be formed from aluminum or other suitable material and provide a touch-sensitive surface formed from the same or different material. The touchpad device may be configured to "dock" within a docking station, with the docking station being wall-mounted and configured to receive the touchpad and be removably coupled thereto for convenient use of the touchpad device while docked. When wall-mounted, the touchpad device may be substantially co-planar with the wall such that touchpad device and wall form a visually seamless surface. However, other embodiments may include the touchpad device angled slightly (e.g., approximately 15 degrees) relative to the wall, or mounted horizontally on a table-top to provide convenient user access. The docking station may further provide a power source for re-charging the one or more batteries of the touchpad device. A user may approach the touchpad device and interact with the same by performing, for example, one-finger gestures to adjust common output light characteristics of one or more lighting devices within operable proximity. To switch or otherwise toggle between lighting devices to adjust, a user may perform so-called navigation gestures such as multi-touch swipes, which may cause the lighting device to target different lighting devices for adjustment purposes. In some cases, users may also perform multi-touch gestures to fine-tune certain lighting characteristics such as color saturation and hue. The touchpad device may also allow a user to perform so-called "copy" gestures to copy lighting characteristics for one or more selected lighting devices into a memory. Likewise, the touchpad device may allow a user to perform a so-called "paste" gesture to paste the copied lighting characteristics from the memory onto one or more other lighting devices. The touchpad device may cause various lighting characteristic adjustments to occur by sending one or more lighting commands via a wireless protocol to one or more lighting devices. Some example wireless protocols include, for example, Wi-Fi, Bluetooth and ZigBee.

As should be appreciated, the techniques for gesture-based lighting adjustments disclosed herein offer numerous advantageous over other approaches. For example, the lighting interface system may be implemented within a relatively simple touchpad device that may be removably attached to a wall and made available as a dedicated lighting adjustment device. This may allow a user to avoid navigating through applications on a smartphone or other portable device to make adjustments to lighting characteristics. Likewise, the techniques for gesture-based lighting adjustments may allow a user to fine-tune a wide-range of lighting characteristics without the necessity of learning complex software applications or physical lighting controllers with buttons, dials and switches. Thus the lighting interface system disclosed herein may allow users to advantageously adopt and exploit the full capabilities of tunable lighting solutions without the necessity of training or specialized technical knowledge.

Example Lighting Interface System and Operation

Now referring to the figures, FIG. 1 shows an example lighting interface system 100 in accordance with an embodiment of the present disclosure. As shown, the example lighting interface system 100 includes a power supply 102, a controller 104, a touchpad sensor 106, a wireless transceiver circuit 108, and an antenna device 110. As should be appreciated, FIG. 1 depicts the lighting interface system 100 in a highly simplified form and that different variations and permutations are within the scope of this disclosure. In an embodiment, the lighting interface system 100 comprises a computing system, such as the computing system 1000 of FIG. 10.

The housing 101 may comprise various physical form factors and styles including, for example, a smart phone or other mobile computing device such as a tablet device. In an embodiment, the housing 101 may be wall-mountable to provide convenient access to a user 103. When wall-mounted, the housing 101 may be flush or otherwise low-profile such that housing 101 "blends" into a wall. In some cases, wall-mounting may be accomplished through use of a docking station (not shown) that allows for the housing 101 to be removably coupled with the docking station for convenient placement and for recharging purposes. The power supply 102 may comprise, for example, one or more power sources capable of providing suitable power (Vcc) to various components of the lighting interface system 100. For example, the power supply 102 may include one or more batteries and associated circuitry configured to provide direct current (DC).

The controller 104 may include at least one processing device or circuit. Some example processing devices include, for example, a Complex Instruction Set Computer (CISC), a field-programmable gate array (FPGA), Reduced Instruction Set Computer (RISC) processor, x86 instruction set processor, microcontroller, an application-specific integrated circuit (ASIC), a graphics processing unit (GPU), or central processing unit (CPU). In some cases, the controller 104 provides at least one processing core. The controller 104 may include or otherwise receive instructions that when executed cause one or more processes to be carried out, such as processes comprising the methods of FIGS. 8 and 9. In an embodiment, the controller 104 may also include a touch-gesture-recognition (TGR) stack 105 implemented in hardware or software, or both, that may be configured to receive one or more time-stamped touchpoints (e.g., Cartesian coordinates) from a touchpad sensor, such as the touchpad sensor 106, and use the same to identify one or more predefined gestures. As should be appreciated, the TGR stack 105 may identify one or more gestures based on mathematical relationships between touchpoints relative to known/predetermined gestures, heuristic analysis and/or other approaches to correlating a received touchpoints with a gesture intended by a user. Thus examples and scenarios disclosed herein that "identify", "determine" or otherwise translate one or more touchpoints into predefined gestures may accomplish such translation using the TGR stack 105.

The memory 109 may comprise, for example, a non-volatile storage device including flash memory and/or volatile storage devices such as Random Access Memory (RAM), Dynamic Random Access Memory (DRAM), and Static Ram (SRAM), for example. The memory 109 may contain a device profiles database 112 or list and a gesture map 114. The device profiles list 112 may include a plurality of lighting device entries, with each lighting device entry including one or more current configuration parameters representing lighting characteristics associated with a given lighting device. For example, the device profiles list 112 may include a first lighting device entry corresponding to the lighting device 112-1 and a second lighting device entry corresponding to the lighting device 112-2. In some cases, the lighting device entries may be added by manual user-input using, for example, a so-called "app" on a smartphone or other computing device. Alternatively, or in addition to manual user-input, the lighting interface system 100 may automatically generate lighting device entries based on, for example, coming within operable proximity to one or more lighting devices. In addition, the lighting interface system 100 may infer a particular location by coming within operable proximity of a lighting device previously detected/known. Once the lighting device is identified, the light interface system 100 may "learn" its present location and switch the device profiles list 112 to devices associated with the present location.

The lighting characteristics associated with each lighting device entry may include values representing, for example, the current luminous intensity, color temperature, hue, saturation, and spatial distribution for a given lighting device. Other lighting characteristics are also within the scope of this disclosure and the provided examples should not be construed as limiting. The lighting characteristics may also be accurately referred to as tunable lighting characteristics. Each lighting device entry within the device profiles list 112 may further include one or more associated lighting device group identifiers. As discussed below, lighting device group identifiers may allow N number of lighting devices to be associated with one another. This may be particularly advantageous when, for example, performing adjustments to a number of lighting devices within a same room or location.

The gesture recognition map 114 may include one or more entries, with each entry correlating a predefined gesture with one or more target lighting characteristics. As discussed further below, a predefined gesture may correspond to multiple target lighting characteristics such that two or more lighting characteristics may be simultaneously adjusted based on a user performing a single gesture. As used herein, the term simultaneously does not necessarily refer to adjustments occurring at an identical instance in time and may include some amount of nominal deviation. In any event, the controller 104 and/or the TGR stack 105 may use the gesture recognition map 114 when analyzing a plurality of touchpoints received based on touch-input by the user 103.

The touchpad sensor 106 may comprise, for example, a resistive or capacitive touchpad sensor device. The touchpad sensor 106 may also include a touchpad controller 107, with the touchpad controller 107 being configured to receive and decode detected touchpoint positions (e.g., XY coordinates).

In some cases, the touchpad sensor 106 couples to the touchpad controller 107 via one or more flexible printed circuits (FPCs). The touchpad controller 107 may include hardware, software, or a combination thereof, configured to receive a signal representative of user input from the touchpad sensor 106 and provide a digital representation of the same to the controller 104. For example, the touchpad sensor 106 may output a voltage or other signal representative of input received from a user. In turn, the touchpad controller 107 may include conditioning circuitry (not shown) such as filters and analog-to-digital (ADC) converters capable of digitizing the voltage or other signal received from the touchpad sensor 106, and may provide the digitized signal to the controller 104.

The touchpad controller 107 may be constructed similarly to that of the controller 104, and to this end, any of the aforementioned enumerated options for the controller 104 are equally applicable to the touchpad controller 107. Further note that the controller 104 and the touchpad controller 107 are not necessarily separate components, such as shown. For example, the controller 104 and the touchpad controller 107 may physically manifest as a single integrated circuit (IC). Moreover, note that the combination of components such as the touchpad controller 107, the controller 104, and the wireless transceiver circuit 108 may be housed within a single system-on-chip (SoC) device.

The wireless transceiver circuit 108 may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the wireless transceiver circuit 108 may operate in accordance with one or more applicable standards in any version. To this end, the wireless transceiver circuit 108 may include, for instance, hardware, circuits, software, or any combination thereof that allows communication with external computer systems. In some specific non-limiting examples, the wireless transceiver circuit 108 comports with the IEEE 802.11 (e.g., Wi-Fi), Bluetooth, low-energy Bluetooth (BLE), ZigBee, near-field communication, or any other suitable wireless communication standard. In addition, the wireless transceiver circuit 108 may comport with cellular standards such as 3G (e.g., EV-DO, W-CDMA) and 4G wireless standards (e.g., HSPA+, WIMAX, LTE).

The lighting devices 112-1 and 112-2 may comprise a same lighting device type, or different lighting device types. In an embodiment, each lighting device may comprise a tunable lighting device such as solid-state lighting (SSL) device although other lighting device types are also within the scope of this disclosure. For example, red-green-blue (RGB) incandescent lighting devices may also be adjusted or otherwise controlled via the lighting interface system 100. As should be appreciated in light of this disclosure, any lighting device providing tunable lighting characteristics may be within the scope of this disclosure.

Figure 2A:
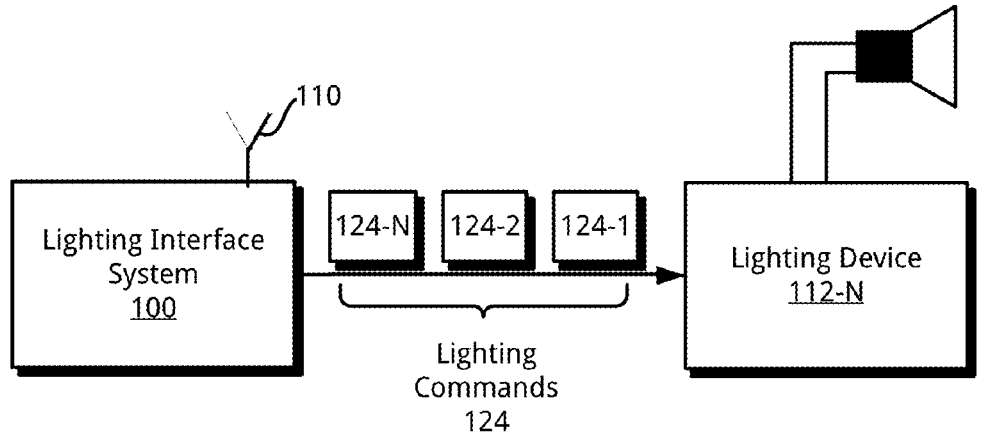
FIG. 2A shows a block diagram of the example lighting interface system of FIG. 1 configured to communicate with a single lighting device in a single-target mode, in accordance with an embodiment of the present disclosure.

Referring to FIG. 2A, with additional reference to FIG. 1, a block diagram illustrates the example lighting interface system 100 configured to wirelessly communicate with a lighting device 112-N in a single-target mode, in accordance with an embodiment of the present disclosure. As generally referred to herein, the term single-target mode refers to a mode of the lighting interface system 100 whereby lighting commands are transmitted to a single target lighting device, such as lighting device 112-N. In some cases, the lighting interface system 100 uses a generic or proprietary data protocol, such as the ZigBee protocol, to communicate with lighting device 112-N. However, it should be appreciated that the lighting interface system 100 can utilize other wireless standards and protocols to communicate with the lighting device 112-N and is not necessarily limited to ZigBee. For instance, the wireless protocol 120 may be an 802.11X (Wi-Fi) protocol, as discussed above.

In use, the example lighting interface system 100, and more particularly, the touchpad controller 107, may receive a signal representing user-input from the touchpad sensor 106. The signal may comprise an analog signal having a voltage level that indicates a particular position of the received user-input. The user-input may include, for example, one or more user fingers in contact or otherwise within detectable proximity of the touchpad sensor 106. The touchpad controller 107 then may digitize the received signal and provide the same to the controller 104. The digitized user-input signal may include an identifier of a coordinate using, for instance, a Cartesian coordinate system. For example, the coordinate identifier may include an X and a Y coordinate that correlates the user's finger to a particular position of the touchpad sensor 106. In the event of a multi-touch event, a plurality of decoded XY coordinates corresponding to each finger may be provided. In any such cases, the decoded XY coordinates may also be accurately referred to as user touchpoints or touchpoints.

The controller 104 may receive the touchpoints and may generate a timestamp in response to receiving the digitized user-input signal. The timestamp may be generated based on, for example, output from a hardware or software clock within the controller 104. Also note that the touchpad controller 107 may generate the timestamp and provide the same to the controller 104. In any such cases, the controller 104 may traverse the plurality of touchpoints to analyze both the spatial and temporal relationship between touchpoints to identify a predetermined gesture. As discussed above, one or more predefined gestures may also map to navigation or selection gestures that cause the lighting interface system 100 to target one or more lighting devices to apply changes to. Gestures received subsequent to the navigation gestures may then cause the lighting interface system 100 to apply changes to the one or more targeted lighting devices. In some cases, the lighting interface system 100 may simply adjust lighting characteristics by applying changes to all lighting devices without a user necessarily performing a navigation gesture to select/target one or more lighting devices.

The controller 104 may use an identified gesture to determine one or more target lighting characteristics to adjust based on performing a lookup via the gesture recognition map 114. The particular extent of the changes to apply to the one or more target lighting characteristics (e.g., an adjustment value) may be based on the translational (or relative) distances traveled by touchpoints, or absolute positioning of touchpoints relative to the surface of the touchpad sensor 106, as discussed in greater detail below with regard to FIGS. 3, 4 and 5. In any event, and in response to the controller 104 having an identified predetermined gesture and the extent of the adjustment to the one or more target lighting characteristics, the controller 104 may use the wireless transceiver circuit 108 to transmit an indication of the same to one or more lighting devices, such as lighting devices 112-1 and 112-2, to cause target lighting devices to output light having characteristics in accordance with the desired changes. For example, the lighting interface system 100, and more particularly the controller 104, may generate a plurality of lighting commands collectively shown as 124, and individually shown as 124-1 to 124-N. Each lighting command 124-1 to 124-N may include an identifier of one or more lighting characteristics to modify and an adjustment value (e.g., positive or negative) to modify each of the one or more lighting characteristics thereby.

As should be appreciated, user-input may continually occur over a period time or otherwise in bursts (e.g., based on swipe gestures), and thus, the lighting interface system 100 may send a stream of corresponding lighting commands 124 to the lighting device 112-N. Thus the frequency and rate of the stream of corresponding lighting commands 124 may vary relative to the occurrence of user input, and the particular type of user input received. For example, a finger tap on the touchpad sensor 106 may generate a single lighting command while a finger swipe across the surface of the touchpad sensor 106 may generate a plurality of lighting commands.

Figure 2B:
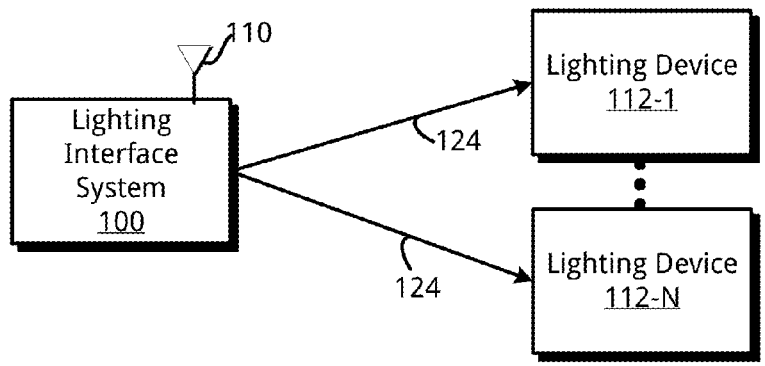
FIG. 2B shows another block diagram of the example lighting interface system of FIG. 1 configured to communicate with N number of lighting devices in a multi-target mode, in accordance with an embodiment of the present disclosure.

The lighting interface system 100 is not necessarily limited to a single-target mode whereby lighting commands get transmitted to a single lighting device, such as illustrated in FIG. 2A. For example, and as shown in FIG. 2B, a block diagram illustrates the example lighting interface system 100 configured to wirelessly communicate with a plurality of lighting devices 112-1 to 112-N while in a multi-target or broadcast mode, in accordance with an embodiment of the present disclosure. As generally referred to herein, the term multi-target mode refers to a mode of the lighting interface system 100 whereby lighting commands are sent to two or more target lighting devices. As shown, the lighting interface system 100 may "broadcast" lighting commands 124 to N number of lighting devices such that a number of lighting devices adjust light output in a generally uniform and simultaneous manner. The lighting interface system 100 may use unicast messaging schemes or multicast messaging schemes, depending on a desired configuration. This may be particularly advantageous when, for example, seeking to adjust the lighting for an entire room or location.

Figure 2C:
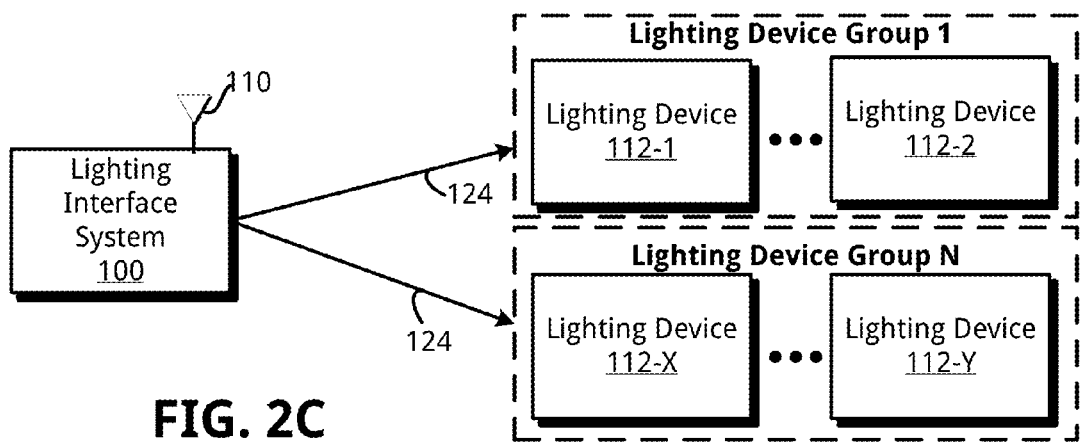
FIG. 2C shows another block diagram of the example lighting interface system of FIG. 1 configured to communicate with N number of groups of lighting devices, in accordance with an embodiment of the present disclosure.

Now referring to FIG. 2C, another block diagram illustrates the example lighting interface system 100 configured to wirelessly communicate with a plurality of lighting device groups 1 to N in a group-target mode, in accordance with an embodiment of the present disclosure. As generally referred to herein, the term group-target mode refers to a mode of the lighting interface system 100 whereby lighting commands are sent to one or more lighting device groups. As previously discussed, lighting devices may be associated with one or more lighting device groups, and thus lighting commands directed at a given lighting device group are transmitted to each lighting device associated with a target lighting device group. Thus the lighting interface system 100 may transmit lighting commands 124 to each lighting device within a particular target group to adjust light output therefrom in a generally uniform and simultaneous manner. As further shown, this may include the lighting interface system 100 transmitting lighting commands 124 to lighting devices 112-1 to 112-2 associated with lighting device group 1 as well as transmitting the lighting commands 124 to N number of additional lighting device groups such as lighting device group N with lighting devices 112-X to 112-Y. As should be appreciated, lighting devices not associated with a target group do not receive lighting commands during the group-target mode, and thus remain unaffected. This may be particularly advantageous when, for example, seeking to adjust one or more lighting devices in a room, such as over a table or couch, while leaving lighting devices in other areas of the room unaffected by the adjustment.

Example Navigation/Selection Gestures

In an embodiment, the lighting interface system 100 may "toggle" between the aforementioned single-target, multi-target, and group-target modes based on navigation or selection gestures. For example, and as shown in FIG. 7N, a three-finger horizontal swipe gesture may cause the lighting interface system 100 to switch between modes. In this example, and as illustrated, a first three-finger horizontal swipe may cause the lighting interface system 100 to select a first lighting device represented within the device profiles list 112. In response to this navigation/selection gesture, the lighting interface system 100 may send a lighting command to the selected first lighting device to cause the same to "blink" or otherwise visually (or audibly) indicate selection to the user 103. When the lighting interface system 100 targets a single lighting device in this manner, this may be understood as entering the single-target mode. Subsequent lighting adjustment gestures by the user 103 may then result in lighting commands being transmitted to the selected first lighting device to cause adjustments to light output therefrom. Likewise, a subsequent navigation gesture may cause the single-target mode to now target/select the second lighting device represented within the device profiles list 112, if present. This pattern of navigation gestures and adjustment gestures may continue a desired number of times. As should be appreciated, this navigation and selection pattern is also applicable to lighting device groups whereby the lighting interface system 100 may switch between lighting device groups versus individual lighting devices. When a particular lighting device group is selected, this may be understood as entering the group-target mode. In response to entering the group-target mode, the lighting interface system 100 may transmit a lighting command to each lighting device associated with a given target lighting device group to cause the same to "blink" or otherwise indicate selection.

In any event, after each individual lighting device or lighting device group within operable proximity of the lighting interface system 100 gets selected in the single-target/group-target mode, e.g., using a three-finger horizontal swipe, a subsequent navigation gesture may cause the lighting interface system 100 to enter the multi-target or broadcast mode. In the multi-target mode, the lighting interface system 100 may send lighting commands to all lighting devices within operable proximity. The particular gesture mapped as navigation gestures is not necessarily limited to a three-finger horizontal swipe gesture and may be different depending on a desired configuration. For example, the lighting interface system 100 may map two-finger horizontal swipes as navigation gestures. Moreover, navigation gestures are not necessarily limited to horizontal gestures and may comprise vertical and/or diagonal gestures. Table 1 summarizes the operation of navigation gestures for one specific non-limiting configuration having 3 lighting devices (or three lighting device groups) within operable proximity of the lighting interface system 100.

TABLE 1

Example Navigation using a 3-Light System

| Navigation Swipe Count | Resulting Mode | Target Lighting Devices |
|---|---|---|
| 1 | Single-Target/Group-Target Mode | First Lighting Device/Group Selected |
| 2 | Single-Target/Group-Target Mode | Second Lighting Device/Group Selected |
| 3 | Single-Target/Group-Target Mode | Third Lighting Device/Group Selected |
| 4 | Multi-Target | All Lighting Devices/Groups Selected |

Gesture Recognition and Example Lighting Control Gestures

Figure 3:
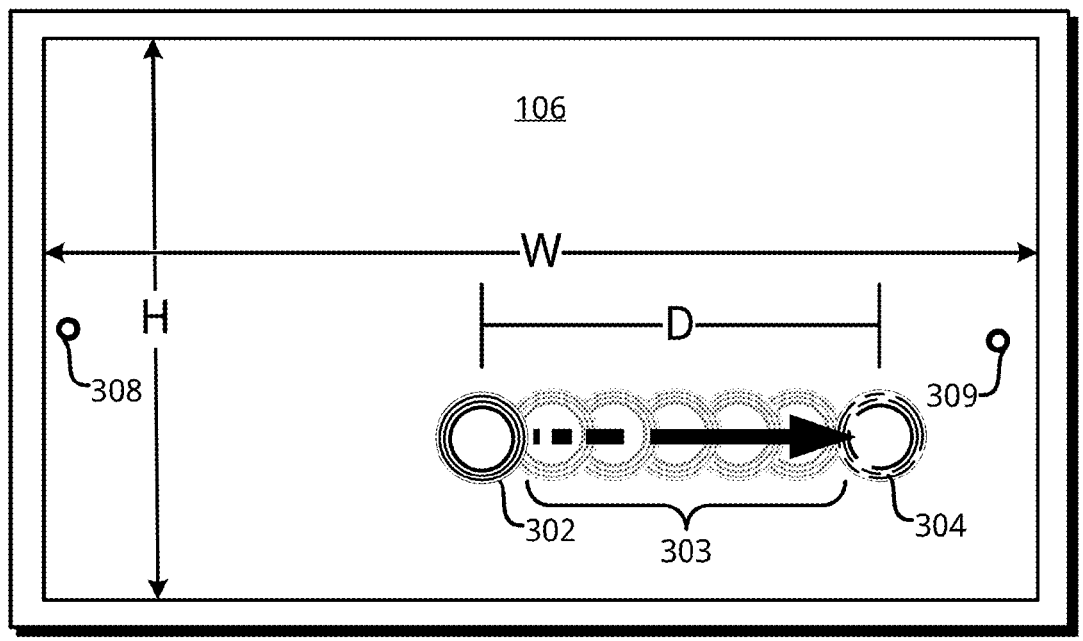
FIG. 3 shows an example touchpad sensor compatible for use with the lighting interface system of FIG. 1 and a plurality of touchpoints that may be detected by the same and used to determine the extent of an adjustment to one or more lighting characteristics, in accordance with an embodiment of the present disclosure.

As previously discussed, the extent of a change (e.g., an adjustment value) applied to lighting characteristics associated with lighting devices may be relative to the touchpoints received by the lighting interface system 100. For example, as shown in FIG. 3, a single-finger horizontal swipe gesture is illustrated and includes a starting touchpoint 302 and an ending touchpoint 304, in accordance with an embodiment of the present disclosure. The single-finger horizontal swipe gesture may be characterized by a single touchpoint 302 transitioning into a plurality of touchpoints 303 ending at touchpoint 304. Thus the particular distance D travelled by the finger, and represented by corresponding touchpoints, may then dictate a particular of degree of desired adjustments to lighting characteristics relative to the width W of the touchpad sensor 106. Likewise, for gestures performed in a vertical direction, e.g., such as the vertical swipe gesture shown in FIGS. 7A and 7B, the extent of the particular adjustments applied may be relative to the height H of the touchpad sensor 106.

In an embodiment, a full-range of lighting characteristic changes, e.g., 0-100%, may be accessible via the touchpad sensor 106 using a single continuous gesture across the touchpad sensor 106 in either a vertical direction or horizontal direction, depending on a desired gesture and configuration. For instance, a horizontal swipe gesture starting at a far-left side of the touchpad sensor and ending at the far-right side of the touchpad sensor may cause an adjustment from 0 to 100% for a given lighting characteristic mapped to that gesture. This may advantageously mitigate the need for multiple gestures/passes.

In an embodiment, the touchpad sensor 106 may include one or more surface landmarks, such as surface landmarks 308 and 309, which may allow a user to identify the start and end of the full range. The surface landmarks 308 and 309 may be flush with the surface of the touchpad sensor 106 and may be formed as a sticker or other marking, for instance, or may comprise a raised surface such as a bump or other suitable tactile feature. Thus a user may cause the lighting interface system 100 to make consistent adjustments in accordance with their desired lighting configuration. For instance, a horizontal gesture with a starting touchpoint at the surface landmark 308 ending at a half-way point between the surface landmark 308 and the surface landmark 309 may result in reliable and expected 50% change.

However, as should be appreciated, a full range of adjustment/scale may be mapped to a distance less than a full width W or height H of the touchpad sensor 106. Likewise, the lighting interface system 100 may not necessarily apply a linear change during swiping/gestures and may apply a logarithmic/non-linear change when, for example, a particular range of adjustments may not necessarily be perceivable by a human eye. For instance, small changes to luminous intensity may not result in an observable change, and thus, the lighting interface system 100 may apply a non-linear adjustment, and as a result make the touchpad sensor 106 more sensitive to user touch, to produce perceivable changes over a smaller distance D travelled by a given gesture. In any event, as and should be appreciated, the lighting interface system 100 may use relative motion to make adjustments to avoid accidental or otherwise unexpected lighting changes caused by a user simply making initial touch-contact with the lighting interface system 100.

Some aspects of adjustments via the lighting interface system 100 may be better understood by way of example. Consider a non-limiting example scenario wherein the single-finger horizontal swipe gesture is mapped to color temperature. A lighting device may have a range of color temperature output from 2700 Kelvin (K) to 6500K, for example. The lighting interface system 100 may map this entire range such that width W, or at least a substantial portion thereof, correlates to values starting at 2700K and increasing therefrom up to 6500K. As further shown, distance D may approximate about 40% of the range, thus causing the lighting interface system 100 to transmit lighting commands to a target lighting device to increase current color temperature by 40%. On the other hand, a single-finger horizontal swipe gesture in an opposite direction may cause a decrease in color temperature proportional to the distance traveled by a finger during the swipe.

Figure 4:
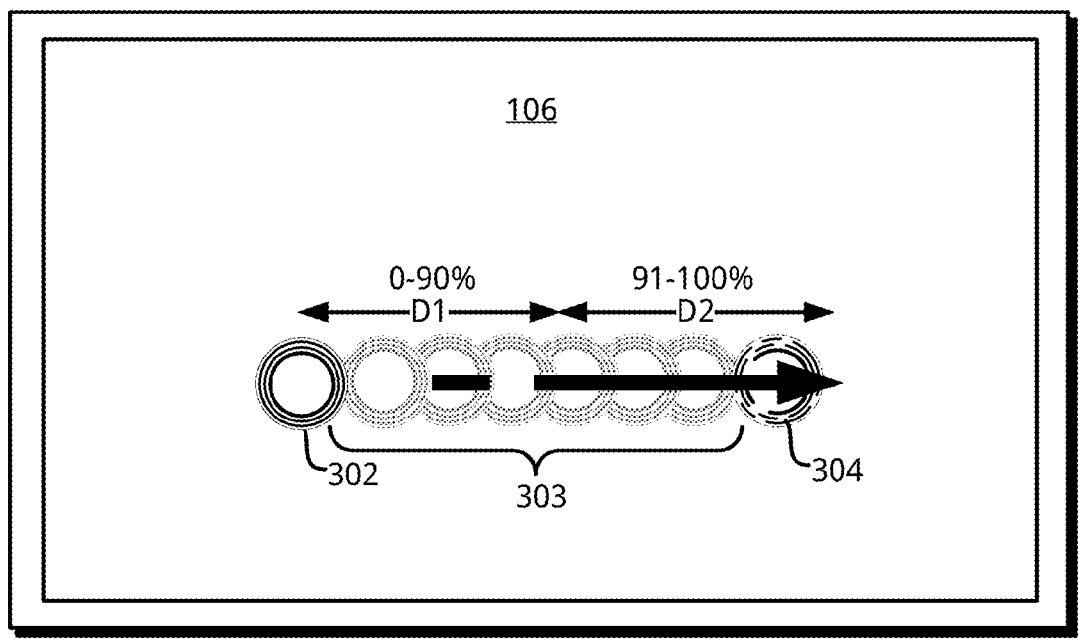
FIG. 4 shows the example touchpad sensor of FIG. 3 configured to slow-down or otherwise reduce sensitivity to allow fine-grain adjustment of one or more lighting characteristics after a distance D traveled by a touch-gesture exceeds a predefined threshold value, in accordance with an embodiment of the present disclosure.

In some cases, fine-grain control may be desirable to more precisely adjust characteristics of light output by the lighting devices. For example, and as shown in FIG. 4, the lighting interface system 100 may slow down the rate of change applied to particular lighting characteristics as a maximum or minimum adjustment value is approaches. The maximum/minimum values may be understood as threshold values. By way of illustration, consider the prior example of color temperature and the touchpad sensor 106 mapping the entire range to about the width W of the touchpad sensor 106. As the single-finger swipe gesture transitions from a single touchpoint 302 to the plurality of touchpoints 303, a distance D1 may be traveled. The distance D1 may account for a 90% increase in color temperature relative to the maximum color temperature value (e.g., 6500K). In response to the lighting interface system 100 detecting the distance D1 was traveled in excess of a predefined threshold (e.g., a 90% increase occurred in color temperature), the touchpoints detected along the distance D2 may cause a smaller change to occur leading up to 100% of the maximum color temperature value. Stated differently, the distance D2 may cause a linear or non-linear change similar to that of changes caused by distance D1 being traveled, but an overall "slower" rate of change to occur. As should be appreciated, the lighting interface system 100 is not necessarily limited to color temperature as measured in degrees Kelvin and may change based on other values and methodologies. For example, while linear response in Kelvin as a function of touchpoint motion functions well to provide a wide-range of user-adjustments, other responses may be better suited to account for the ability of the human eye to discriminate between color temperatures. One such example includes the lighting interface system 100 having response units of MacAdam ellipses. While specific examples and scenarios reference color temperature specifically, the aforementioned fine-tuning techniques are equally applicable to other gestures and lighting characteristics generally disclosed herein and should not be construed as limiting.

Thus the lighting interface system 100 may allow for relative motion to govern the extent of changes to lighting characteristics in a smooth, continuous fashion, which may advantageously prevent inadvertent discontinuities in light output to be minimized or otherwise mitigated, such as discontinuities that may result based on initial touch-contact with the touchpad sensor 106. In one embodiment, the distance D of touchpoints must exceed a particular threshold prior to the lighting interface system 100 applying an adjustment to a lighting device. In some cases, the predefined threshold is up to about 50% of the overall width W or height H of the touchpad sensor 106. Note that the width W and height H may be same when, for example, the touchpad sensor 106 is configured in a square or otherwise non-rectangular shape. The shape of the touchpad sensor 106 is not particularly relevant to the present disclosure and numerous geometries and configurations are within the scope of this disclosure.

Figure 5:
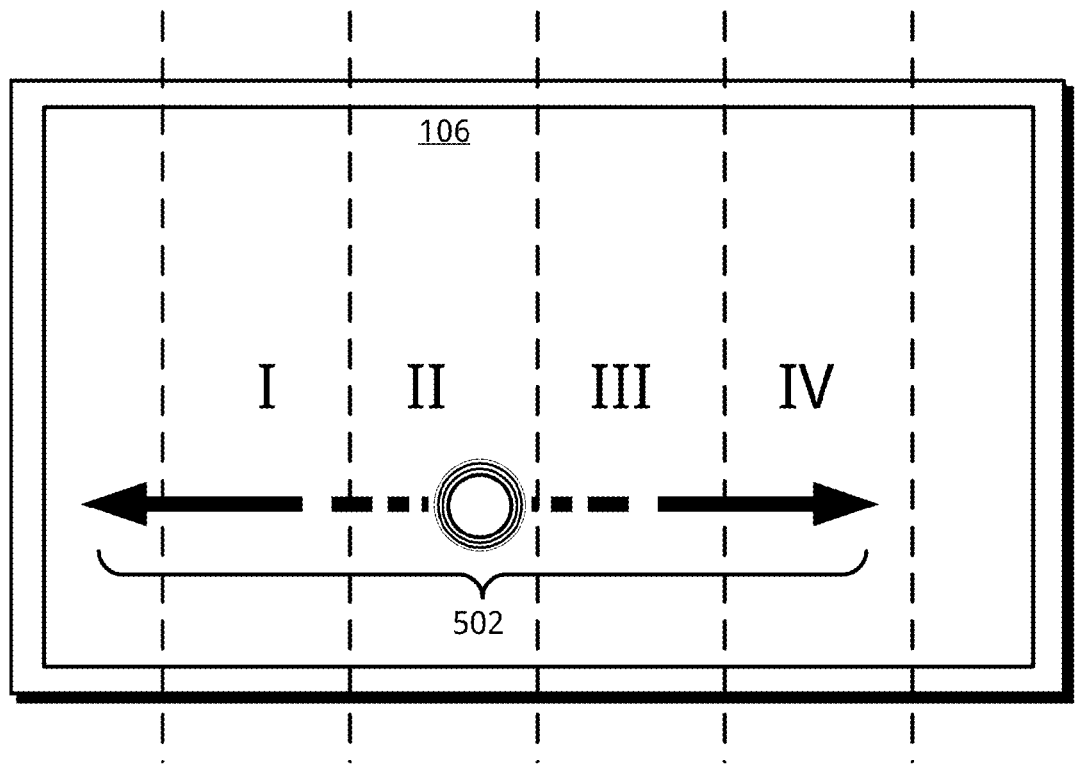
FIG. 5 shows the example touchpad sensor of FIG. 3 configured to determine the extent of an adjustment to one or more lighting characteristics based on absolute positioning of detected touchpoints, in accordance with an embodiment of the present disclosure.

Alternatively, or in addition to lighting characteristic adjustment based on relative motion, the extent of the change may be governed by an exact placement or absolute position of the touchpoints such that, for example, the touchpad sensor 106 includes a plurality of positions that correspond directly to the particular amount of adjustment to apply. For example, and as shown in FIG. 5, the touchpad sensor 106 may define a plurality of regions, such as regions I to IV. Thus when a single-finger swipe/tap gesture 502 encounters a middle-position of the touchpad sensor 106 (e.g., within region II), the lighting interface system 100 may cause luminous intensity to be output by one or more lighting devices at 50%, while a single-finger swipe/tap gesture that encounters a position at the far right-end of the touchpad sensor 106 (e.g., region IV) may cause luminous intensity to be output by a lighting device at 100%, depending on desired configuration. As should be appreciated any of the example gestures and associated lighting characteristics disclosed herein may utilize such absolute positioning, if desired.

The aspects and scenarios discussed above directed to the lighting interface system 100 interpreting relative and absolute positioning for the purposes of adjustments are not necessarily limited to single-finger gestures, and gestures that travel a relatively straight-path of motion. For example, the aspects and scenarios discussed above are equally applicable to multi-touch gestures, as well as gestures that may travel along non-straight lines, e.g., the gesture illustrated in FIG. 7H.

Figure 6:
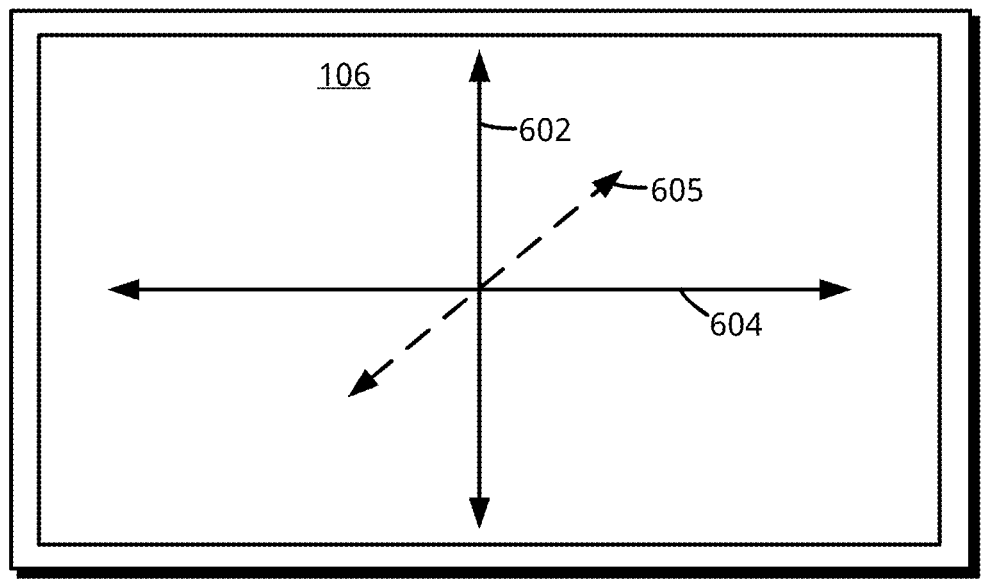
FIG. 6 shows the example touchpad sensor of FIG. 3 and various horizontal, vertical and diagonal axis used to identify one or more gestures to control lighting characteristics, in accordance with an embodiment of the present disclosure.

Also, while some specific example gestures and scenarios disclosed herein are directed to identifying gestures that are substantially horizontal or substantially vertical in nature (e.g., within ±15°), this disclosure is not necessarily limited in this regard. In an embodiment, the lighting interface system 100 may be configured to detect substantially diagonal gestures (e.g., within ±15°), and in response thereto, execute adjustments to two or more lighting characteristics. For example, and turning to FIG. 6, the touchpad sensor 106 may be configured to identify swipe gestures based on receiving touchpoints that substantially extend along a horizontal axis 604 or a vertical axis 602. In addition the lighting interface system 100 may receive touchpoints indicating a swipe gesture that extends substantially along a diagonal axis, such as the diagonal axis 605. In response to receive a diagonal gesture, the lighting interface system 100 may cause both color temperature changes and luminous intensity changes to occur simultaneously, for example. As should be appreciated the lighting interface system 100 may map diagonal gestures to other lighting characteristics and is not necessarily limited to intensity and color temperature. In an embodiment, the lighting interface system 100 may selectively enable or disable diagonal gesture recognition. For example, the touchpad sensor 106 may simply register only those gestures that include substantially horizontal or vertical directions of motion and ignore certain gestures that substantially occur along a diagonal axis.

Example 1—Finger Lighting Control Gestures

Some example single-touch gestures will now be discussed in turn. In some cases, the lighting interface system 100 may provide simple, single-touch gestures for the purpose of adjusting common lighting characteristics. However, the lighting interface system 100 may allow gestures to be selectively mapped or programmed to different lighting characteristics depending on a desired configuration. For this reason, the specific examples of gestures and lighting characteristics should not be construed as limiting the present disclosure. Table 2 summarizes some non-limiting examples of gestures mapped to lighting characteristics.

TABLE 2

Example Lighting Adjustment Gesture Mappings

| Gesture | Mapped Lighting Characteristics |
|---|---|
| Single-finger Vertical Up/Down Swipe | Luminous Intensity/Brightness (e.g., 0-100%) |
| Single-finger Horizontal Left/Right Swipe | Color Temperature (e.g., in Kelvin) |

Figure 7A:
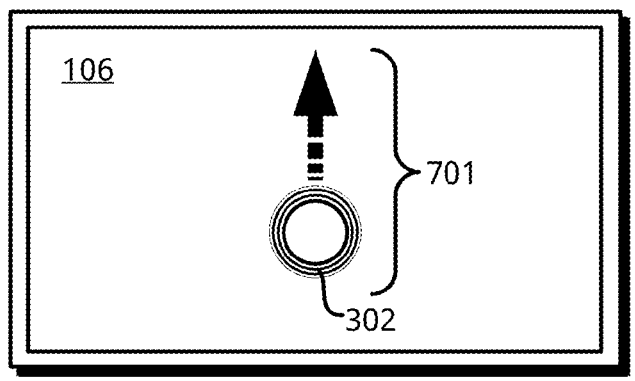
FIGS. 7A-7D illustrate various one-finger horizontal and vertical gestures that may be recognized by the lighting interface system of FIG. 1 and used to adjust lighting characteristics output by one or more lighting devices, in accordance with various embodiments disclosed herein.

Turning to FIG. 7A, one example single-finger vertical swipe gesture 700 is shown in accordance with an embodiment of the present disclosure. As shown, the starting touchpoint 302 transitions into a plurality of touchpoints extending upward in a vertical direction. The lighting interface system 100 may identify the single-finger vertical swipe gesture 701, and in response thereto, identify a corresponding lighting characteristic to adjust based on an entry in the gesture mapping database 114. In some cases, the lighting characteristic may correspond to brightness or luminous intensity. Thus, a user performing the single-finger swipe gesture 701 may cause the lighting interface system 100 to send lighting commands to one or more lighting devices to adjust brightness/intensity accordingly. As previously discussed, the width/height of the touchpad sensor 106 may correspond to an entire range of intensity values for a given lighting device (e.g., 0 to 100%). However, if finer control of intensity is desired, the lighting interface system 100 may allow for configurable sensitivity/ranges of values. Likewise, to avoid discontinuities or otherwise "jumping" around of output light characteristics, the intensity adjustment may be dependent on the relative motion of the touchpoints rather than an absolute position on the surface of the touchpad sensor 106. Thus a user may not experience a perceivable discontinuity in intensity after initial contact with the touchpad sensor 106. Note, the adjustments to intensity may not necessarily be applied in a linear fashion, and the particular change may be applied based on a percentage change or some other non-linear increment/decrement scheme.

Figure 7B:
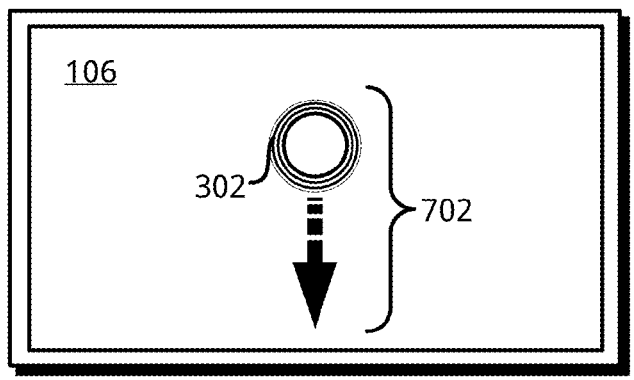

Turning to FIG. 7B, another example single-finger vertical swipe gesture 702 is shown in accordance with an embodiment of the present disclosure. As shown, the single-finger vertical gesture may be substantially similar to that of the single-finger vertical swipe gesture 701, except for the touchpoints extending in a downward versus upward direction. Thus the single-finger vertical swipe gesture 702 may compliment the single-finger vertical swipe gesture 701 such that an opposite adjustment is made. For instance, swiping upward using the single-finger vertical swipe gesture 701 may increase intensity/brightness while swiping downward using the single-finger vertical swipe gesture 702 may decrease intensity/brightness.

In an embodiment, the sensitivity of the touchpad sensor 106 is such that the full range (e.g., 0-100%) of intensity values may be accessible in approximately one pass across the surface of the touchpad sensor 106, if the starting touchpoint 302 is initiated near of the edge of the touchpad sensor 106, thus minimizing the need for multiple passes. For example, starting from a 100% intensity level, motion of a starting touchpoint from the upper edge of touchpad sensor 106 downwards to the halfway point may result in about a 50% intensity level, if the intensity scale is set to a linear response. However, a non-linear response is equally applicable. For instance, a square law function may be used to give the user more precise control at the dimmest levels of operation. Likewise, an "S" function may provide users with precise control at both the lowest and highest ends of the intensity range.

Figure 7C:
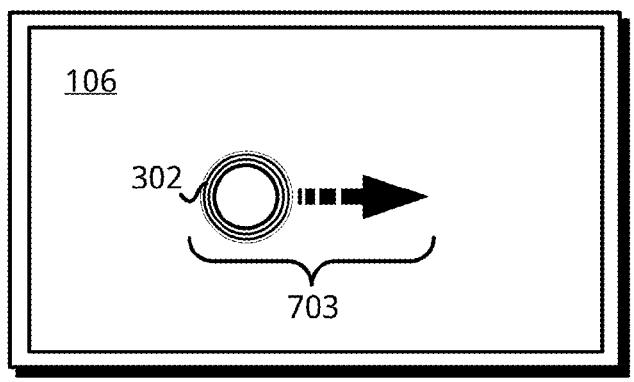
Figure 7D:
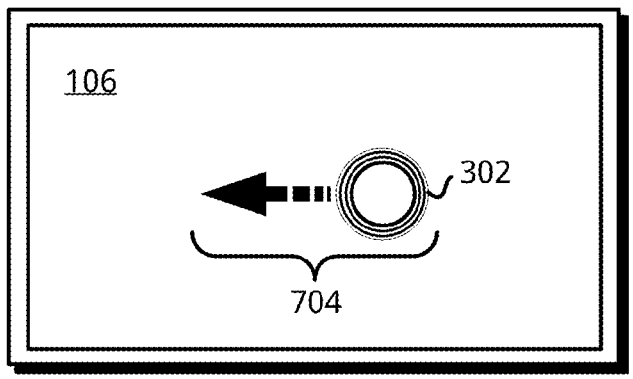

Turning to FIG. 7C, one example single-finger horizontal swipe gesture 703 is shown in accordance with an embodiment of the present disclosure. As shown, the starting touchpoint 302 transitions into a plurality of touchpoints extending rightward in a horizontal direction. The lighting interface system 100 may identify the single-finger vertical swipe gesture 703, and in response thereto, identify a corresponding lighting characteristic to adjust based on an entry in the gesture mapping database 114. In some cases, the lighting characteristic may correspond to color temperature. Thus, a user performing the single-finger swipe gesture 703 may cause the lighting interface system 100 to send lighting commands to one or more lighting devices to adjust color temperature accordingly. Likewise, and as shown in FIG. 7D, another example single-finger horizontal swipe gesture 704 is shown in accordance with an embodiment of the present disclosure. As shown, the single-finger horizontal swipe gesture 704 may be substantially similar to that of the single-finger horizontal gesture 703, except for the touchpoints extending in a leftward versus rightward direction. Thus the single-finger horizontal swipe gesture 704 may compliment the single-finger horizontal gesture 703 such that an opposite adjustment is made. For instance, swiping to the right using the single-finger horizontal swipe gesture 703 may increase color temperature while swiping to the left using the single-finger horizontal swipe gesture 704 may decrease color temperature.

Thus, in accordance with an embodiment, a user may perform a simple 1-finger gesture in a horizontal direction on the touchpad sensor 106 to adjust the color temperature of white light. The lighting interface system 100 may respond to the motion of the touchpoints caused by the gesture by increasing the color temperature for rightward motion and decreasing the color temperature for leftward motion. In an embodiment, the sensitivity may be such that the full range of color temperatures (e.g., 2700-6500K) may be accessible within approximately one pass across the touchpad sensor 106 if the starting touchpoint is initiated near the edge of the controller, thus minimizing the need for multiple passes. For example, starting at 2700K, motion of a starting touchpoint from the left edge of the control surface rightwards to the halfway point may reliably result in a color temperature of about 4600K, if the intensity scale is set to a linear response. However, as should be appreciated, the response may be in units of MacAdam ellipses or other units if desired.

Example Multi-Touch Lighting Control Gestures

Some example multi-touch gestures will now be discussed in turn. In some cases, the lighting interface system 100 may provide multi-touch gestures for the purpose of intuitively adjusting a plurality of lighting characteristics that may extend beyond merely intensity and color temperature. However, the lighting interface system 100 may allow gestures to be selectively mapped or programmed to different lighting characteristics depending on a desired configuration. For this reason, the specific examples of gestures and lighting characteristics should not be construed as limiting the present disclosure. Table 3 summarizes some non-limiting examples of gestures mapped to lighting characteristics.

TABLE 3

Example Multi-Touch Lighting Adjustment Gesture Mappings

| Gesture | Mapped Lighting Characteristics |
| --- | --- |
| Multi-Finger "Pinch" and "Zoom" Gesture | Color Saturation |
| Multi-Finger "Twist" or Finger-Rotate Gesture | Hue |

Figure 7E:
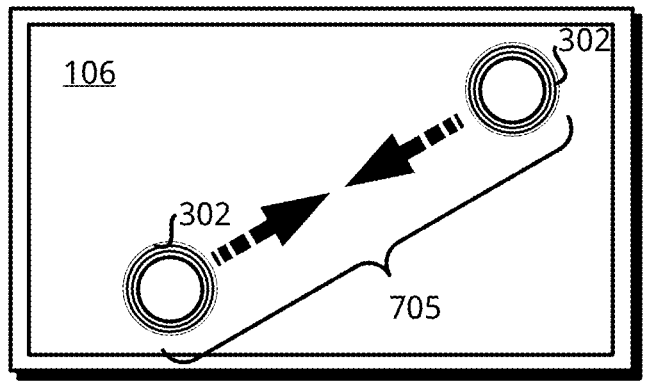

Turning to FIG. 7E, one example multi-finger pinch gesture 705 is shown in accordance with an embodiment of the present disclosure. As shown, the starting touchpoints 302 transition into a plurality of touchpoints extending inwards towards each other, e.g., corresponding to a pinch motion executed by two fingers, or a thumb and a finger. The lighting interface system 100 may identify the multi-finger pinch gesture 705, and in response thereto, identify a corresponding lighting characteristic to adjust based on an entry in the gesture mapping database 114. In some cases, the lighting characteristic may correspond to color saturation. Thus, a user performing the multi-finger pinch gesture 705 may cause the lighting interface system 100 to send lighting commands to one or more lighting devices to adjust color saturation accordingly. As previously discussed, the width/height of the touchpad sensor 106 may correspond to an entire range of color saturation values for a given lighting device (e.g., 0 to 100%).

Figure 7F:
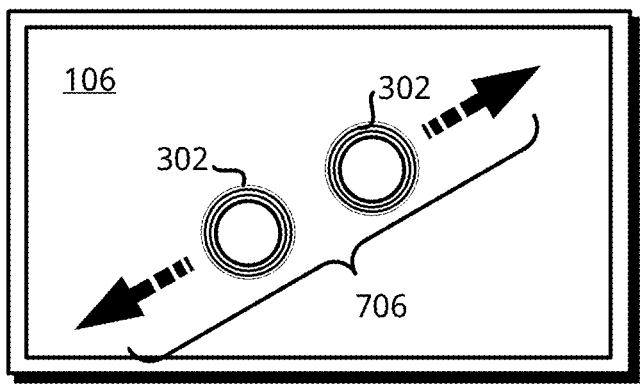

Turning to FIG. 7F, another example multi-finger zoom gesture 706 is shown in accordance with an embodiment of the present disclosure. As shown, the multi-finger zoom gesture 706 may be substantially similar to that of the multi-finger pinch gesture 705, except for the touchpoints extending away from each other in an outward fashion. Thus the multi-finger zoom gesture 706 may compliment the multi-finger pinch gesture 705 such that an opposite adjustment is made. For instance, pinching using the multi-finger pinch gesture 705 may decrease color saturation, while zooming using the multi-finger zoom gesture 706 may increase color saturation.

Thus in an accordance with an embodiment, the lighting interface system 100 may add distinct colors to white light when the color saturation level is increased via a "zoom" gesture, wherein the separation between two starting touchpoints 302 is increased. The lighting interface system 100 may respond to relative motion of the touchpoints and may increase the color saturation based on the increasing separation of the starting touchpoints 302, and may decrease the color saturation based on the decreasing separation of the starting touchpoints 302.

In some cases, the sensitivity of the lighting interface system 100 is such that the full range of color saturation may be accessible within approximately one pinch gesture, if the gesture starts at minimum touchpoint separation (e.g., fingers together) and ends at maximum separation (e.g., fingers apart), thus minimizing the need for multiple passes. Zero color saturation may correspond to a chromaticity on the blackbody curve, whereas maximum saturation may correspond to a point on the boundary of the allowed gamut as determined by the specific LEDs comprising a given lighting device.

Figure 7H:
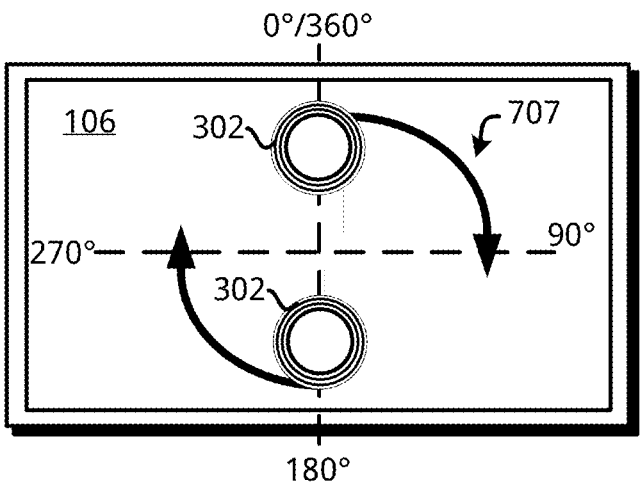

Turning to FIG. 7H, one example multi-finger rotation gesture 707 is shown in accordance with an embodiment of the present disclosure. As shown, the starting touchpoints 302 transition into a plurality of touchpoints which rotate relative to one another along a substantially circular path. The lighting interface system 100 may identify the multi-finger rotation gesture 707, and in response thereto, identify a corresponding lighting characteristic to adjust based on an entry in the gesture mapping database 114. In some cases, the lighting characteristic may correspond to hue. Thus, a user performing the multi-finger rotation gesture 707 may cause the lighting interface system 100 to send lighting commands to one or more lighting devices to adjust hue accordingly.

Thus, in accordance with an embodiment, the lighting interface system 100 may select the specific hue of saturated color based on a user making multi-finger contact with the touchpad sensor 106 followed by touchpoints that rotate about a substantially circular path. The circular path may include a plurality of positions/locations, whereby certain degrees of travel along the circular path (e.g., 15°, 30°, and 45°) correspond to specific hue values. In some cases, the distance between two such positions causes a blending of two hues with the particular ratio of the hues being dependent on proximity to a position associated with one hue relative to the other. For example, clockwise rotation may cause the lighting interface system 100 to present the following order of colors: red-pink-purple-blue-green-yellow-orange-red, which corresponds to a clockwise traversing of the boundary of the prescribed gamut in CIE 1931 chromaticity space, for example. On the other hand, counter-clockwise rotation may cause the lighting interface system to present the same order of colors in reverse. Other color mappings are also within the scope of this disclosure.

In an embodiment, the full set of colors may be selectable within a comfortable range of motion for a user. For instance, the full range of colors may be traversed in about 90 degrees of rotation. For higher precision in choosing hues, and in accordance with an embodiment, the rotation range can be increased, e.g., up to 180° or more. In some cases, a user may pick up their fingers off the surface of the touchpad sensor 106 and repeat the rotation gesture a number of times to select a desired hue. As should be appreciated, the lighting interface system 100 may perform adjustment only after a particular amount of motion is detected, and thus, the user may pick-up and reposition their fingers without inadvertently making hue adjustments when reestablishing touch-contact with the touchpad sensor 106.

In an embodiment, the particular hue output by a given lighting device changes with rotation by shifting between a plurality of colors, such as, red-green-blue-yellow (RGBY), provided by associated light emitting diodes (LEDs), for example. Thus, the color change response with rotation may be dependent on the specific RGBY colors implemented by the given lighting device. In other embodiments, the lighting interface system may implement a device agnostic function that takes into account the ability of the human eye to discern colors and control the hue change per degree of rotation in terms of MacAdam ellipses, for example.

Example Scene Save and Recall Gestures

The lighting interface system 100 may allow users to make targeted lighting adjustments across N number of lighting devices to produce a scene with particular lighting characteristics. Thus, the particular current lighting characteristics for one or more lighting devices represented within the lighting device profiles list 112 may be collectively referred to as a "scene." In an embodiment, the lighting interface system 100 may allow scenes to be stored and recalled based on one or more gestures, which will now be discussed in turn. As should be appreciated, different gestures may be mapped to scene save/restore functions, and the particular examples illustrated in FIGS. 7I and 7J should not be construed as limiting the present disclosure.

Figure 7I:
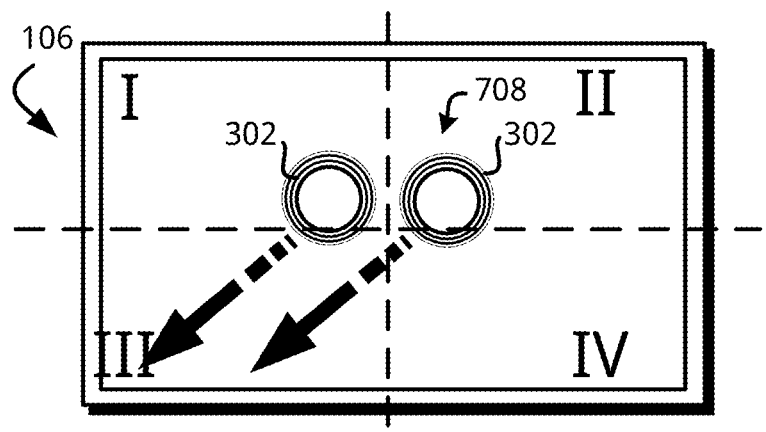
FIGS. 7I-7J illustrate example multi-touch gestures that may be recognized by the lighting interface system of FIG. 1 and used to save and recall a plurality of current lighting characteristics collectively known as a scene, in accordance with an embodiment of the present disclosure.

Turning to FIG. 7I, one example save-scene gesture 708 is shown in accordance with an embodiment of the present disclosure. As shown, the starting touchpoints 302 transition into a plurality of touchpoints which extend along a diagonal path substantially parallel to each other. The lighting interface system 100 may identify the save-scene gesture 708, and in response thereto, cause a set of lighting characteristics corresponding to a currently selected lighting device or lighting device group to be stored for recall purposes. As should be appreciated, the particular lighting device or lighting device group may be selected based on navigation gestures discussed above with regard to FIG. 7N. In an embodiment, the lighting interface system 100 may support N number of scenes to save for later recall. For instance, but not intended to limit the present disclosure, the lighting interface system 100 may recognize four (4) distinct save regions labeled I to IV, with each save region corresponding to a memory location within the memory 109. Thus a scene may be saved to a particular memory location by the user performing the save-scene gesture 708 and having an ending touchpoint fall within a particular save region. In an embodiment, the lighting interface system 100 may send a lighting command to each lighting device associated with the saved scene in order to cause each lighting device to "blink" or otherwise indicate a scene was saved to memory.

Figure 7J:
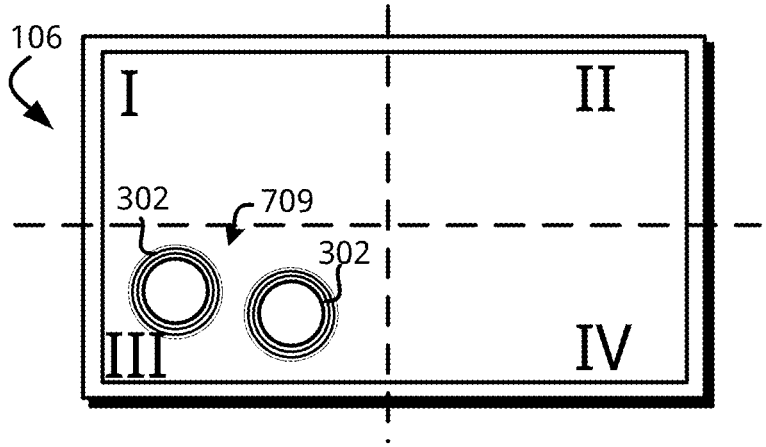

Referring to FIG. 7J, one example restore-scene gesture 709 is shown in accordance with an embodiment of the present disclosure. As shown, the starting touchpoints 302 correspond to what essentially may be understood to be a two-finger "tap" or a "tap-and-hold" gesture. Thus, in this context, the starting touchpoints 302 may be both the starting and ending touchpoints. The lighting interface system 100 may identify the restore-scene gesture 709, and in response thereto, may identify a target set of lighting characteristics or scene to restore, with the target set being based on the particular save region in which the restore-scene gesture 709 occurred, and a currently-selected lighting device or lighting device group. Alternatively, or in addition to the tap-based restore-scene gesture, the lighting interface system may support a drag-based restore gesture. For example, the save-scene gesture 708 depicted in FIG. 7I may be repeated, but in reverse, with the starting touchpoints 302 starting in a given save region (e.g., region III) and transitioning to a plurality of touchpoints with a path of motion that ends at generally a middle of the surface of the touchpad sensor 106. Thus, the lighting interface system 100 may recall a particular scene by identifying the initial region corresponding to the starting touchpoints and restore the scene if the ending touchpoints end substantially at the center position of the touchpad sensor 106.

Thus, and in accordance with an embodiment, the lighting interface system 100 may allow currently-applied lighting characteristics to be saved and recalled for a selected lighting device or lighting device group based on a save-scene gesture and restore-scene gesture, respectively. The lighting interface system 100 may allow N number of previous scenes to be stored and recalled. Although a total of four (4) save regions are illustrated, the lighting interface system may support other numbers of save regions, and geometries/boundary shapes for those save regions.

Figure 7K:
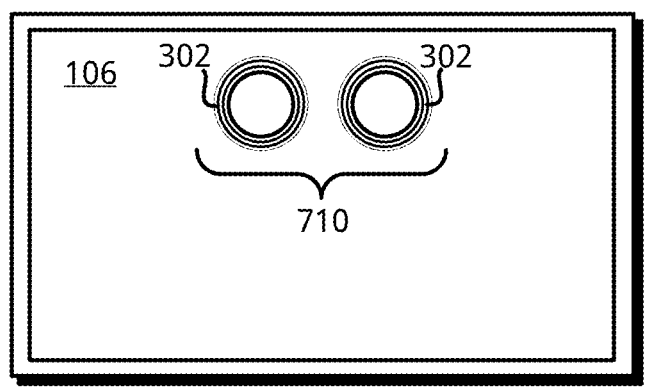
FIG. 7K shows one example multi-touch gesture that may be recognized by the lighting interface system of FIG. 1 and used to toggle one or more lighting devices on or off, in accordance with an embodiment of the present disclosure.

Referring to FIG. 7K, one example on-off gesture 710 is shown in accordance with an embodiment of the present disclosure. As previously discussed, lighting devices may effectively be turned off based on, for example, a one-finger slide gesture to reduce intensity to zero. In addition, the lighting interface system 100 may allow for a two-finger tap, or tap-and-hold, gesture to be performed to turn off light output from a currently selected lighting device or lighting device group, such as illustrated in FIG. 7K. In the event the lighting device(s) are already off or otherwise at an intensity of zero, a subsequent two-finger tap, such as shown in FIG. 7K, may result in intensity values being restored to a level prior to bring switched off. Thus the on-off gesture 710 may be accurately described as an on-off toggle gesture.

Turning now to FIG. 7N, one example horizontal three-finger swipe gesture is shown in accordance with an embodiment of the present disclosure. As previously discussed, the three-finger horizontal swipe gesture may map to a navigation gesture. In an embodiment, each time a navigation gesture is performed, the lighting interface system 100 targets a different subset of lighting devices, or lighting device groups, based on an order within the device profiles list 112. The list of groups may be configurable based on, for example, a so-called "app" executed via a smartphone app. In an embodiment, the lighting interface system includes at least one group that includes all lighting devices for a given location. In some cases, positional data is known and may be used to order the particular lighting such that navigation gestures select lamps in a right-to-left fashion or other order such that selection appears to follow a logical ordering from the perspective of a user. As previously discussed, selection of a lighting device or group of lighting devices may result in a blink or other indication. The particular duration and pattern may be configurable depending on a desired configuration.

When the end of the device profiles list 112 is reached, a subsequent navigation gesture (e.g., a three-finger horizontal sliding gesture) may return control to the group at the beginning of the list, or alternatively, to all lighting devices (e.g., the multi-target mode). In some case, navigation gestures may be performed in a "backward" fashion such that lighting devices or lighting device groups may be selected in a reverse order. As should be appreciated, and in accordance with an embodiment, when lighting control gestures such as those directed to, for example, intensity, color temperature, color, scene saving and recall are performed, those gestures only affect the selected lighting device or lighting device group. Thus each lighting device may be separately adjustable such that its particular lighting characteristics are different from other lighting devices within a same location.

In some cases, the lighting interface system 100 may support creation of groups using gestures. For instance, the three-finger horizontal sliding gesture may be used to select a lighting device or lighting device group already in the list. Then a 3-finger tap gesture (or tap-and-hold gesture), for example, may add an identifier of the selected lighting device or lighting device group to the memory 109. Then, a different target lighting device may be selected based on a three-finger horizontal sliding gesture, followed by a single or double-tap gesture which then may cause the lighting interface system 100 to associate the newly-selected lighting device with the identifier previously stored in the memory 109. Thus the target lighting device may be associated with another lighting device to form a group, or may be added to an existing group. Multiple lighting devices may be added in this manner based on, for instance, navigating to those lighting devices via three-finger horizontal swipe gestures followed by a tap-gesture.

Figure 7L:
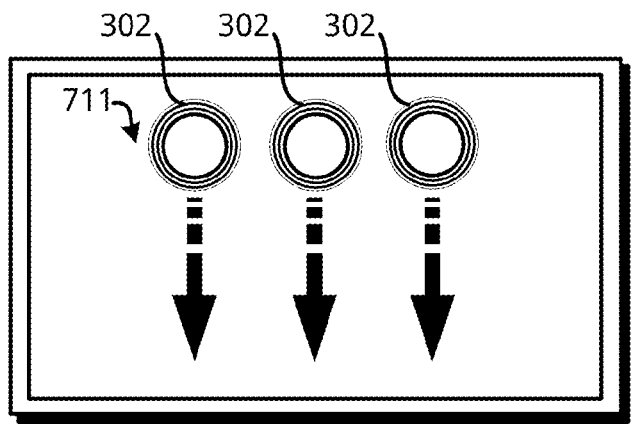
FIGS. 7L-7M show example multi-touch gestures that may be recognized by the lighting interface system of FIG. 1, and may be used to cause copy and paste operations of lighting characteristics between one or more lighting devices, in accordance with an embodiment of the present disclosure.
Figure 7M:
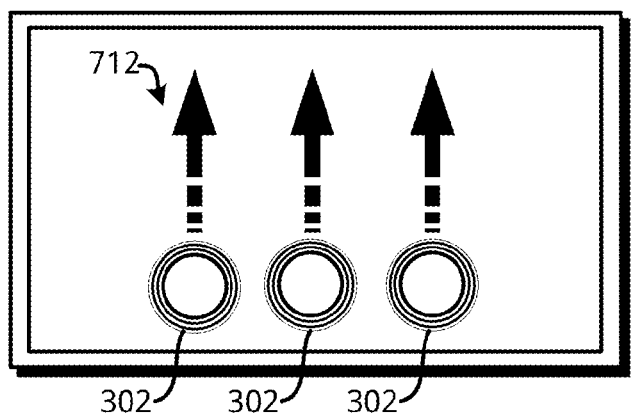
Figure 7N:
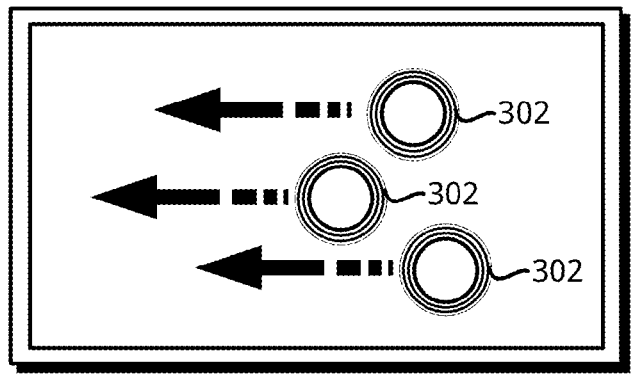
FIG. 7N shows an example multi-touch gesture that may be recognized by the lighting interface system of FIG. 1 as a navigation gesture, in accordance with an embodiment of the present disclosure.

When creating or otherwise adjusting scenes, the lighting interface system 100 may allow the transfer of lighting characteristics from one lighting device or lighting device group to another lighting device or lighting device group. For instance, as shown in FIG. 7L one example copy-scene gesture 711 is shown in accordance with an embodiment of the present disclosure. As shown, the starting touchpoints 302 transition into a plurality of touchpoints which extend along a downward path substantially parallel to each other. The lighting interface system 100 may identify the copy-scene gesture 711, and in response thereto, save values representing one or more current lighting characteristics for a presently selected lighting device or lighting device group to the memory 109. Likewise, as shown in FIG. 7M, one example paste-scene gesture 712 is shown in accordance with an embodiment of the present disclosure. As shown, the starting touchpoints 302 transition into a plurality of touchpoints which extend along an upward path substantially parallel to each other. The lighting interface system 100 may identify the paste-scene gesture 712, and in response thereto, retrieve one or more copied lighting characteristics stored in the memory 109 (e.g., based on the copy-scene gesture discussed above) and overwrite one or more current lighting characteristics for a presently-selected lighting device or lighting device group using the retrieved lighting characteristics. Thus, in a general sense, a user may perform a downward motion to "pull down" current lighting characteristics from a selected device and an upward motion to "push" the copied lighting characteristics onto one or more other lighting devices. The particular direction for copy/paste may be inverted, and the illustrated gestures of FIGS. 7L and 7M should not be construed as limiting the present disclosure.

Figure 7O:
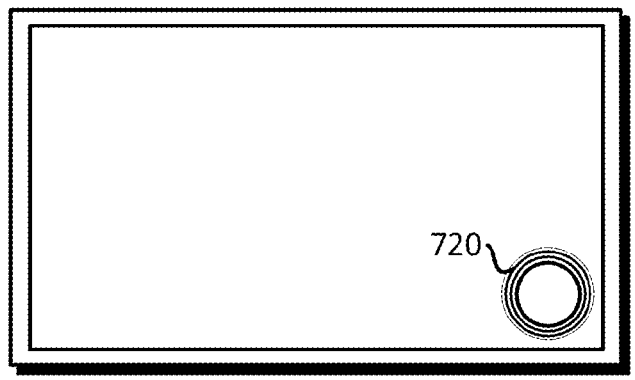
FIG. 7O shows an example tap-gesture that may be recognized by the lighting interface system of FIG. 1 and used to cause the same to return lighting characteristics to a known or otherwise default state, in accordance with an embodiment of the present disclosure.

Now referring to FIG. 7O, the lighting interface system 100 may enable a so-called "home" gesture whereby lighting characteristics for all lighting devices (or a subset of selected lighting devices) are brought back to a known or otherwise default state. For example, a home navigation may result in all active lighting devices outputting a 50% white (e.g., 3000k-3500K). The lighting interface system 100 may include a physical home button (not shown) or a particular general position on the touchpad sensor 106 treated as a home button. One such home position is shown at touchpoint 720. In some cases, a raised dot or other distinguishing visual/tactile feature may indicate a "home" position on the surface of the touchpad sensor 106. When tapped by a user using, for instance, a one-finger tap gesture, the lighting interface system may return lighting characteristics for all presently-selected lighting devices within operable proximity to a known or default level.

Example Methodology and Architecture

Figure 8:
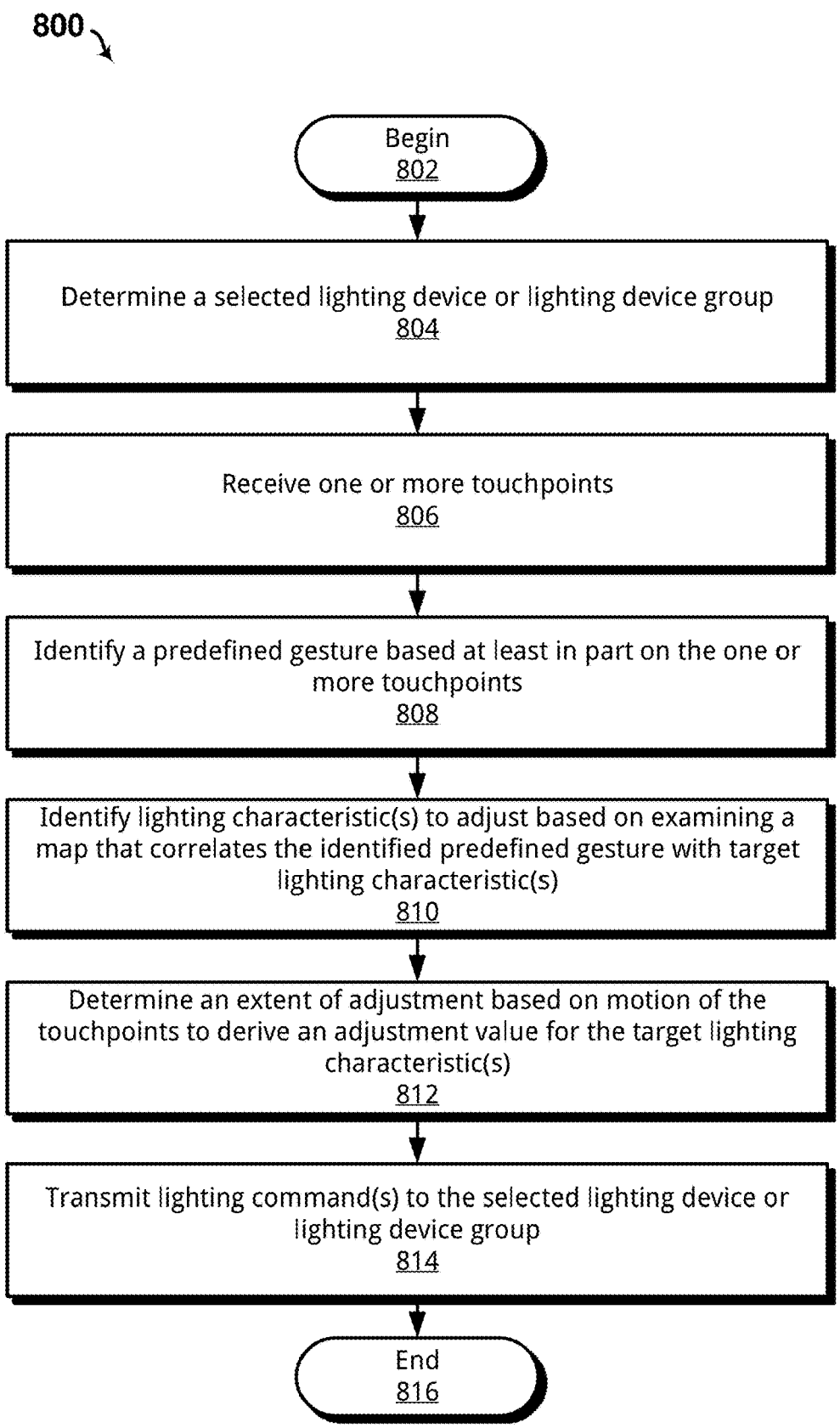
FIG. 8 shows one example method for receiving a plurality of touchpoints via touchpad sensor and using the same to adjust lighting characteristics for one or more lighting devices, in accordance with an embodiment of the present disclosure.

As previously discussed, an embodiment of the present disclosure includes a method for receiving and identifying predetermined light adjustment gestures and adjusting output light characteristics for one or more lighting devices based on the same. One such example method 800 is shown in FIG. 8. The method 800 may be implemented in hardware or software, or any combination thereof. In one specific example embodiment, the example method 800 comprises a plurality of computer-readable instructions that may be executed by lighting interface system 100, and more particularly the controller 104. However, as should be appreciated the method 800 may also be performed, in whole or in part, by other suitable hardware of the lighting interface system 100. As should be appreciated, the acts of method 800 may not necessarily be executed in the order given, and moreover, some acts may be omitted, added or otherwise augmented depending on a desired implementation. Method 800 begins in act 802.

In act 804, the lighting interface system 100 determines a selected target lighting device or lighting device group. In some cases, the target lighting device or lighting device group is selected based on a user performing a navigation gesture, such as the three-finger horizontal swipe gesture shown in FIG. 7N.

In act 806, the lighting interface system 100 receives one or more touchpoints based on a user interacting with the touchpad sensor 106. In some cases, the touchpoints correspond to single-finger or multi-touch gestures, such as those previously discussed with regard to FIGS. 7A-7H.

In act 808, the lighting interface system 100 identifies a predefined gesture based at least in part on the one or more touchpoints received in act 806. In an embodiment, the lighting interface system 100 identifies the predefined gesture based on examining a plurality of touchpoints and associated timestamps to detect a pattern. In some cases, the lighting interface system 100 uses the TGR stack 105 to perform gesture analysis.

In act 810, the lighting interface system 100 identifies one or more lighting characteristics to adjust based on a examining a map, such as the gesture map 114, to correlate the identified predefined gesture with one or more associated target lighting characteristics. As previously discussed, the lighting characteristics may correspond to at least one of luminous intensity, color temperature, color saturation and hue.

In act 812, the lighting interface system 100 determines the extent of adjustment to apply based on motion of the touchpoints to derive an adjustment value for each of the one or more lighting characteristics identified in act 810. As previously discussed with regard to FIGS. 3 and 4, the extent of change may be based on relative motion of the gesture identified in act 808 or absolute positioning of the gesture relative to the surface of the touchpad sensor 106.

In act 814, the lighting interface system 100 transmits one or more lighting commands to the selected lighting device or lighting device group determined in act 804. Each lighting command may include an indication of an adjustment, with the indication identifying a target lighting characteristic and an adjustment value to adjust the target lighting characteristic thereby.

Figure 9:
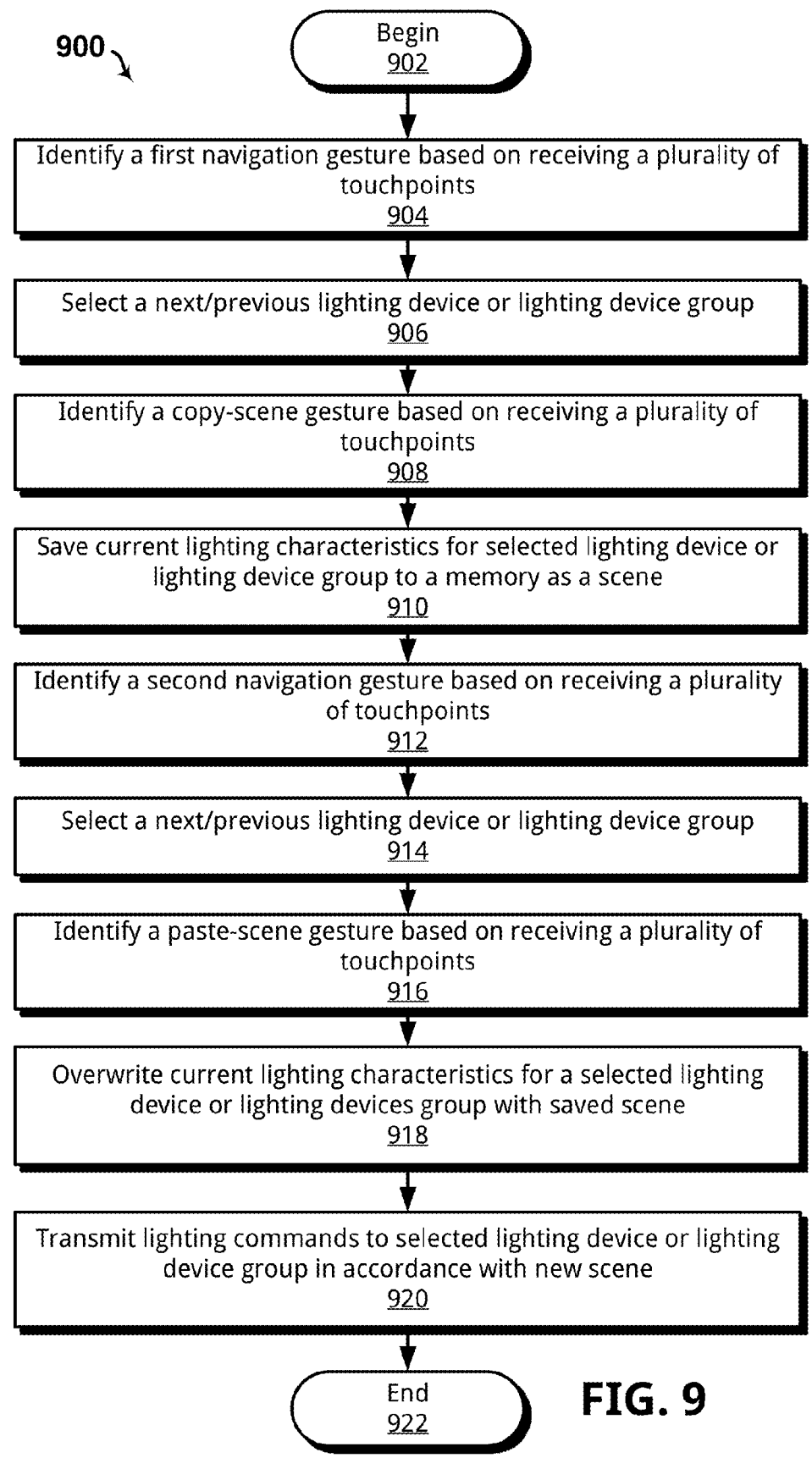
FIG. 9 shows another example method for identifying a navigation gesture to cause selection/targeting of one or more lighting devices, and using copy and paste operations to copy associated lighting characteristics between one or more lighting devices, in accordance with an embodiment of the present disclosure.

Now referring to FIG. 9, an example method is shown for identifying navigation gestures and selecting a lighting device or lighting device group to adjust output light characteristics, in accordance with an embodiment of the present disclosure. The example method 900 may be implemented in hardware or software, or any combination thereof. In an embodiment, the controller 104 is configured to perform the method 900. However, as should be appreciated the method 900 may also be performed, in whole or in part, by other suitable hardware of the lighting interface system 100. As should be appreciated, the acts of method 900 may not necessarily be executed in the order given, and moreover, some acts may be omitted, added or otherwise augmented depending on a desired implementation. Method 900 begins in act 902

In act 904, the lighting interface system 100 identifies a first navigation gesture based on receiving a plurality of touchpoints. In some cases, the first navigation gesture may be identified based on the touchpad controller 107 receiving a plurality of touchpoints in accordance with the gesture illustrated in FIG. 7N.

In act 906, the lighting interface system 100 selects a next or previous lighting device or lighting device group, depending on the particular navigation gesture received in act 904. For instance, a three-finger horizontal swipe gesture to the right may cause a previous lighting device or lighting device group to be selected, while a three-finger horizontal swipe gesture to the left may cause a previous lighting device or lighting device group to be selected. The particular order of selection may be based on the order of the entries within the device profiles list 112. In act 908, the lighting interface system 100 may identify a copy-scene gesture, such as the copy-scene gesture illustrated as a three-finger vertical swipe gesture shown in FIG. 7L. In response, and in act 910, the lighting interface system 100 may store/save values representing current lighting characteristics for the presently selected lighting device or lighting device group to a memory as a scene.

In act 912, the lighting interface system 100 may identify a second navigation gesture based on receiving a plurality of touchpoints. In act 914, the lighting interface system 100 selects a previous or next lighting device or lighting device group. In act 916, the lighting interface system 100 receives a paste-scene gesture, such as the three-finger vertical swipe gesture shown in FIG. 7N. In response, and in act 918, the lighting interface system 100 overwrites current lighting characteristics for a selected lighting device or lighting device group with the scene saved in act 910. In act 920, the lighting interface system 100 transmits one or more lighting commands to the selected lighting device or lighting device group in accordance with the saved scene. For instance, each lighting command may include an indication of an adjustment to apply based on the values associated with the saved scene, with the indication including one or more target lighting characteristics and an adjustment value to apply to the one or more target lighting characteristics.

Example System

Figure 10:
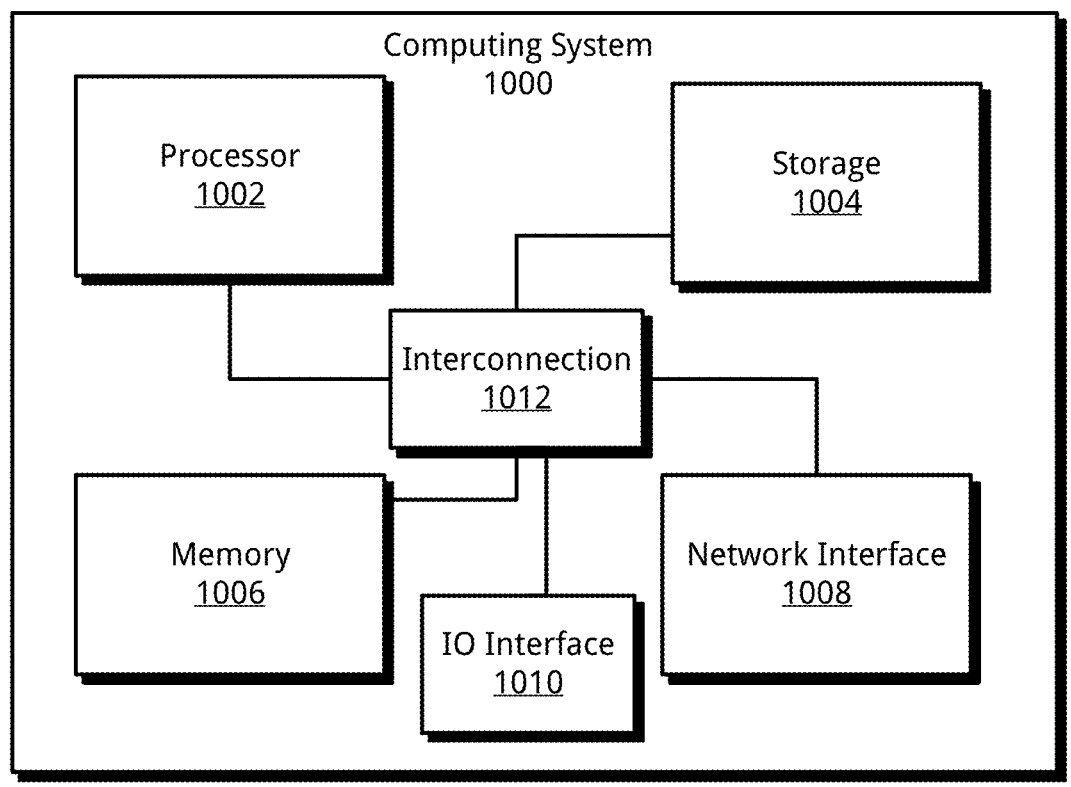
FIG. 10 illustrates a computing system configured to execute various processes for gesture-based control of lighting characteristics in accordance with techniques and aspects provided in the present disclosure.

FIG. 10 illustrates a computing system 1000 configured to execute processes in accordance with techniques and aspects provided in the present disclosure. As can be seen, the computing system 1000 houses a processor 1002, a data storage device 1004, a memory 1006, a network interface 1008, an IO interface 1010 and an interconnection element 1012. To execute at least some aspects provided herein, the processor 1002 receives and performs a series of instructions that result in the execution of routines and manipulation of data. In some cases, the processor is at least two processors. In some such cases, the processor may be multiple processors or a processor with a varying number of processing cores. The memory 1006 may be random access (RAM) and configured to store sequences of instructions and other data used during the operation of the computing system 1000. To this end, the memory 1006 may be a combination of volatile and non-volatile memory such as dynamic random access memory (DRAM), static memory (SRAM), or flash memory, etc. The network interface 1008 may be any interface device capable of network-based communication. Some examples of such a network interface include an Ethernet, Bluetooth, Fibre Channel, Wi-Fi and RS-232 (Serial). The data storage device 1004 includes any computer readable and writable non-transitory storage medium. The storage medium may have a sequence of instructions stored thereon that define a computer program that may be executed by the processor 1002. In addition, the storage medium may generally store data in contiguous and non-contiguous data structures within a file system of the storage device 1004. The storage medium may be an optical disk, flash memory, a solid state drive (SSD), etc. During operation, the computing system 1000 may cause data in the storage device 1004 to be moved to a memory device, such as the memory 1006, allowing for faster access. The IO interface 1010 may be any number of components capable of data input and and/or output. Such components may include, for example, a display device, a touchscreen device, a mouse, a keyboard, a microphone, external device (USB, fire wire, etc.) and speakers. The interconnection element 1012 may comprise any communication channel/bus between components of the computing system 1000 and operate in conformance with standard bus technologies such as USB, IDE, SCSI, PCI, etc.

Although the computing system 1000 is shown in one particular configuration, aspects and embodiments may be executed by computing systems with other configurations. For example, the computing system 1000 may comprise a tablet device. Thus, numerous other computer configurations and operating systems are within the scope of this disclosure. For example, the computing system 1000 may be a propriety computing device with a mobile operating system (e.g., an Android device). In other examples, the computing system 1000 may implement a Windows®, or Mac OS® operating system. Many other operating systems may be used, and examples are not limited to any particular operating system.

Further Example Embodiments

One aspect of the present disclosure is directed to a computer-implemented method, the method comprising determining, by a controller, at least one target lighting device, receiving, by the controller, a plurality of touchpoints corresponding to user input via a touchpad sensor, identifying, by the controller, a predefined gesture based at least in part on the plurality of touchpoints, determining, by the controller, a target lighting characteristic associated with the identified predefined gesture, determining, by the controller, an adjustment value for the target lighting characteristic based at least in part on the identified predefined gesture and a travel distance D defined, at least in part, by a starting position and an ending position of the plurality of touchpoints, and sending, by the controller, an indication of the target lighting characteristic and the adjustment value to the at least one target lighting device.

Another aspect of the present disclosure is directed to a system, the system comprising a wireless transceiver circuit, a touchpad sensor, and at least one processor configured to communicatively couple to the wireless transceiver circuit and the touchpad sensor, and configured to determine at least one target lighting device, receive a plurality of touchpoints corresponding to user input via the touchpad sensor, identify a predefined gesture based at least in part on the plurality of touchpoints, determine a target lighting characteristic associated with the predefined gesture, determine an adjustment value for the target lighting characteristic based at least in part on the identified predefined gesture and a travel distance D defined, at least in part, by a starting position and an ending position of the plurality of touchpoints, and send, via the wireless transceiver circuit, an indication of the target lighting characteristic and the adjustment value to the at least one target lighting device.

Yet another aspect of the present disclosure is directed to a non-transitory computer-readable medium comprising a plurality of instructions encoded thereon that when executed by at least one processor cause a process to be carried out, the process configured to determine at least one target lighting device, receive a plurality of touchpoints corresponding to user input via a touchpad sensor, identify a predefined gesture based at least in part on the plurality of touchpoints, determine at least two target lighting characteristics associated with the predefined gesture, determine an adjustment value for each of the at least two target lighting characteristics based at least in part on the identified predefined gesture and a travel distance D defined, at least in part, by a starting position and an ending position of the plurality of touchpoints, and send an indication of the at least two target lighting characteristics and each respective adjustment value to the at least one target lighting device.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method comprising:
   determining, by a controller, at least one target lighting device;
   receiving, by the controller, a plurality of touchpoints corresponding to user input via a touchpad sensor;
   identifying, by the controller, a predefined gesture based at least in part on the plurality of touchpoints;
   determining, by the controller, a target lighting characteristic associated with the identified predefined gesture;
   determining, by the controller, an adjustment value for the target lighting characteristic based at least in part on the identified predefined gesture and a travel distance (D) defined, at least in part, by a starting position and an ending position of the plurality of touchpoints;
   sending, by the controller, an indication of the target lighting characteristic and the adjustment value to the at least one target lighting device; and
   sending, by the controller, a rate of change of the target lighting characteristic to the at least one target lighting device, wherein the rate of change is a non-linear function of the adjustment value.

2. The method of claim 1, wherein the adjustment value is a non-linear function of the travel distance (D).

3. The method of claim 1, wherein the rate of change comprises a first value for a first portion of the adjustment value that is less than a threshold adjustment value, and a second value for a second portion of the adjustment value that is greater than the threshold adjustment value.

4. The method of claim 1, wherein when the travel distance (D) is less than a threshold distance, the controller does not send the indication of the target lighting characteristic and the adjustment value to the at least one target lighting device.

5. The method of claim 1, wherein the at least one target lighting device comprises a lighting device with tunable output light characteristics, the tunable output light characteristics including at least one of luminous intensity, color temperature, color saturation and hue.

6. The method of claim 1, wherein the predefined gesture corresponds to a multi-touch gesture.

7. The method of claim 1, wherein:
   the predefined gesture comprises a two-finger rotating gesture that includes two starting touchpoints that transition into a plurality of touchpoints that rotate about a circular path in a clockwise or counter-clockwise fashion;
   the two-finger rotating gesture corresponds to a hue light characteristic; and
   a plurality of points about the circular path map corresponds to a plurality of selectable hues.

8. The method of claim 1, wherein determining, by the controller, at least one target lighting device comprises receiving a navigation gesture via the touchpad sensor.

9. The method of claim 8, wherein the navigation gesture causes the controller to target one or more lighting devices of the at least one target lighting device based on an ordered list of lighting device identifiers stored in a memory.

10. The method of claim 8, wherein receiving the navigation gesture further causes the controller to send a lighting command to the at least one target lighting device, the lighting command being configured to cause the at least one target lighting device to blink.

11. The method of claim 1, further comprising:
    identifying, by the controller, a copy-gesture based at least in part on the plurality of touchpoints; and
    saving, by the controller, values representing a plurality of current lighting characteristics associated with the at least one target lighting device to a memory.

12. The method of claim 1, further comprising:
    identifying, by the controller, a paste-gesture based at least in part on the plurality of touchpoints;
    retrieving, by the controller, values representing a plurality of lighting characteristics from a memory;
    setting, by the controller, values representing a plurality of current lighting characteristics associated with the at least one target lighting device to the retrieved values; and
    sending, by the controller, an indication of the plurality of lighting characteristics and adjustment value based on the retrieved values.

13. A system comprising:
    a wireless transceiver circuit;
    a touchpad sensor; and
    at least one processor configured to communicatively couple to the wireless transceiver circuit and the touchpad sensor, and configured to:
      determine at least one target lighting device;
      receive a plurality of touchpoints corresponding to user input via the touchpad sensor;
      identify a predefined gesture based at least in part on the plurality of touchpoints;
      determine a target lighting characteristic associated with the predefined gesture;
      determine an adjustment value for the target lighting characteristic based at least in part on the identified predefined gesture and a travel distance (D) defined, at least in part, by a starting position and an ending position of the plurality of touchpoints;

send, via the wireless transceiver circuit, an indication of the target lighting characteristic and the adjustment value to the at least one target lighting device; and send, via the wireless transceiver circuit, a rate of change of the target lighting characteristic to the at least one target lighting device, wherein the rate of change is a non-linear function of the adjustment value.

14. The system of claim 13, wherein the at least one target lighting device comprises a lighting device with tunable output light characteristics, the tunable output light characteristics including at least one of luminous intensity, color temperature, color saturation and hue.

15. The system of claim 13, wherein:

the predefined gesture comprises a two-finger rotating gesture that includes two starting touchpoints that transition into a plurality of touchpoints that rotate about a circular path in a clockwise or counter-clockwise fashion;

the two-finger rotating gesture corresponds to a hue light characteristic; and a plurality of points about the circular path map corresponds to a plurality of selectable hues.

16. The system of claim 13, wherein the adjustment value is a non-linear function of the travel distance (D).

17. The system of claim 13, wherein the rate of change comprises a first value for a first portion of the adjustment value that is less than a threshold adjustment value, and a second value for a second portion of the adjustment value that is greater than the threshold adjustment value.

18. The system of claim 13, wherein when the travel distance (D) is less than a threshold distance, the at least one processor does not send the indication of the target lighting characteristic and the adjustment value to the at least one target lighting device.

* * * * *